United States Patent [19]

Taira

[11] Patent Number: 5,592,326
[45] Date of Patent: Jan. 7, 1997

[54] DEVICE AND METHOD FOR WAVELENGTH CONVERSION

[75] Inventor: Yoichi Taira, Tokyo-to, Japan

[73] Assignee: International Business Machines Corporation, Armonk, N.Y.

[21] Appl. No.: 489,189

[22] Filed: Jun. 9, 1995

[30] Foreign Application Priority Data

Oct. 28, 1994 [JP] Japan ................... 6-3054885

[51] Int. Cl.⁶ ........................................... G02F 1/39
[52] U.S. Cl. ..................... 359/326; 359/330; 372/21
[58] Field of Search ................... 359/326–332; 372/21–22

[56] References Cited

U.S. PATENT DOCUMENTS

| | | | |
|---|---|---|---|
| 4,879,722 | 11/1989 | Dixon et al. | 372/21 |
| 5,038,352 | 8/1991 | Lenth et al. | 372/21 |
| 5,309,454 | 5/1994 | Taira | 372/21 |
| 5,331,650 | 7/1994 | Maeda et al. | 359/328 X |
| 5,483,374 | 1/1996 | Tanuma | 359/328 |

FOREIGN PATENT DOCUMENTS

| | | | |
|---|---|---|---|
| 1-312529 | 12/1989 | Japan | G02F 1/37 |
| WO89/12922 | 12/1989 | WIPO | H01S 3/10 |

OTHER PUBLICATIONS

D. Serkland et al., "Monolithic Total Internal Reflection Resonator for External Resonant Second–harmonic Generation of 2018nm", IEEE, Proc. of the Conference on Lasers and Electro-Optics, May 10–15, 1992, pp. 530–531.

*Primary Examiner*—John D. Lee
*Attorney, Agent, or Firm*—Thomas R. Berthold

[57] ABSTRACT

A wavelength conversion device 10 comprises a laser device 12 for radiating light beams, a collimeter lens system 18 including lenses 14, 16 for adjusting the wavefront and diameter of a light beam to condense light, a resonator 26 comprising mirrors 22, 24 of the same radius of curvature, and a crystal 20 located inside the resonator 26 near beam-condensing sites and having a large receptive angle. The resonator 26 is a confocal resonator wherein the focus and center of curvature of the mirror 22 are equal to those of the mirror 24 and the radius of curvature of the mirrors 22, 24 exceeds the curvature of the wavefront of light beams from the collimeter lens system 18. Therefore, when a light beam is reflected from the mirrors 22, 24, the curvature of its wavefront is changed and an SHG light comprising only light beams that pass through the forward path is output efficiently.

2 Claims, 18 Drawing Sheets

10 Wavelength conversion device
12 Laser device
18 Collimator lens system (light radiation means)
20 Crystal (nonlinear optical material)
22 First mirror (reflection means)
24 Second mirror (reflection - transmission means)
26 Resonator (resonance means)

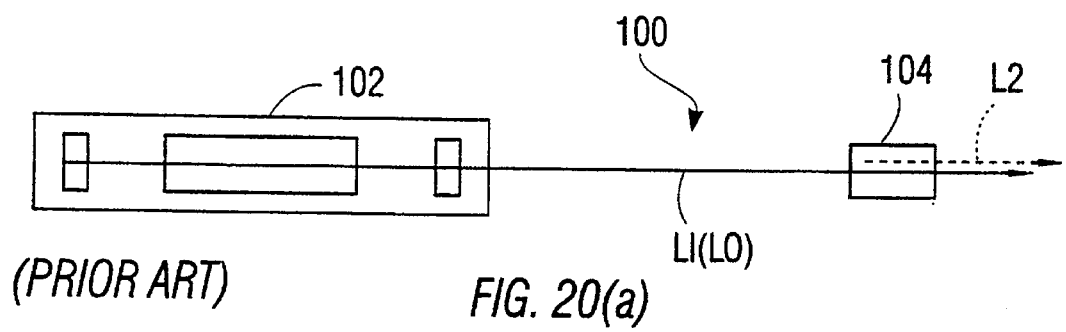
(PRIOR ART)   FIG. 20(a)
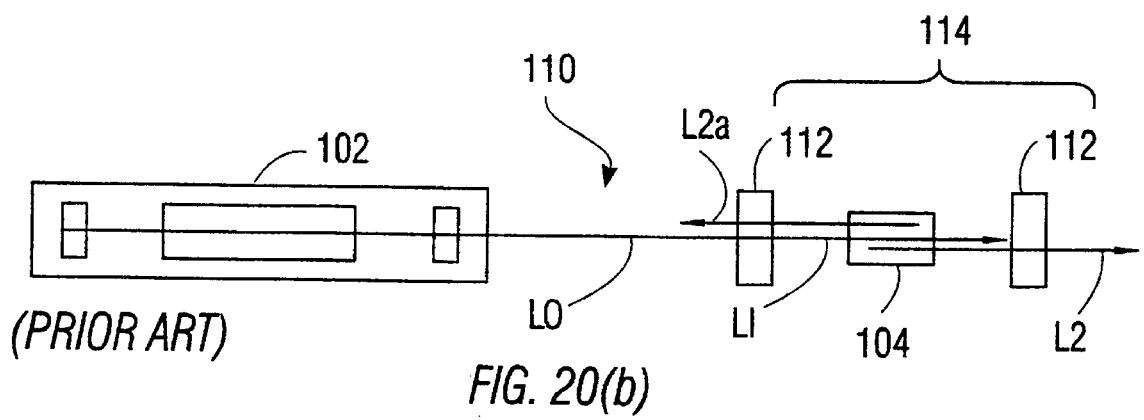
(PRIOR ART)   FIG. 20(b)
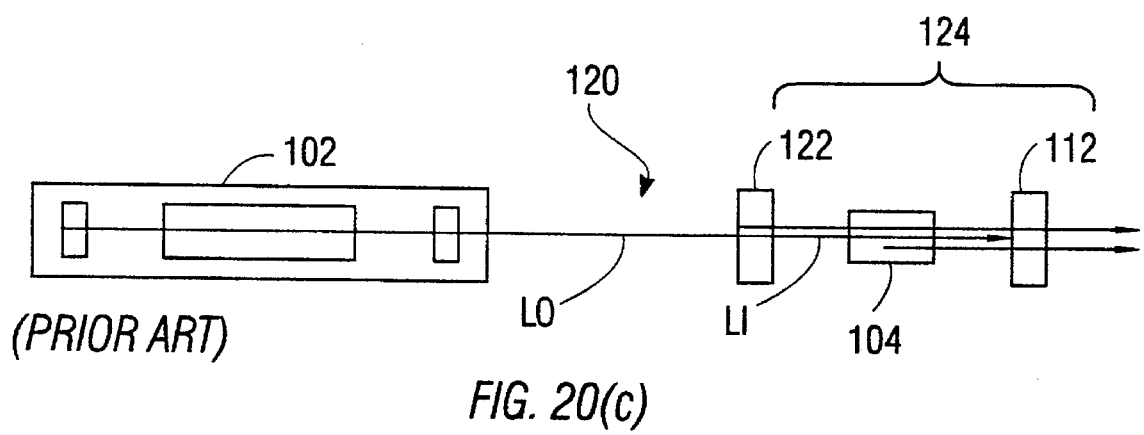
(PRIOR ART)   FIG. 20(c)
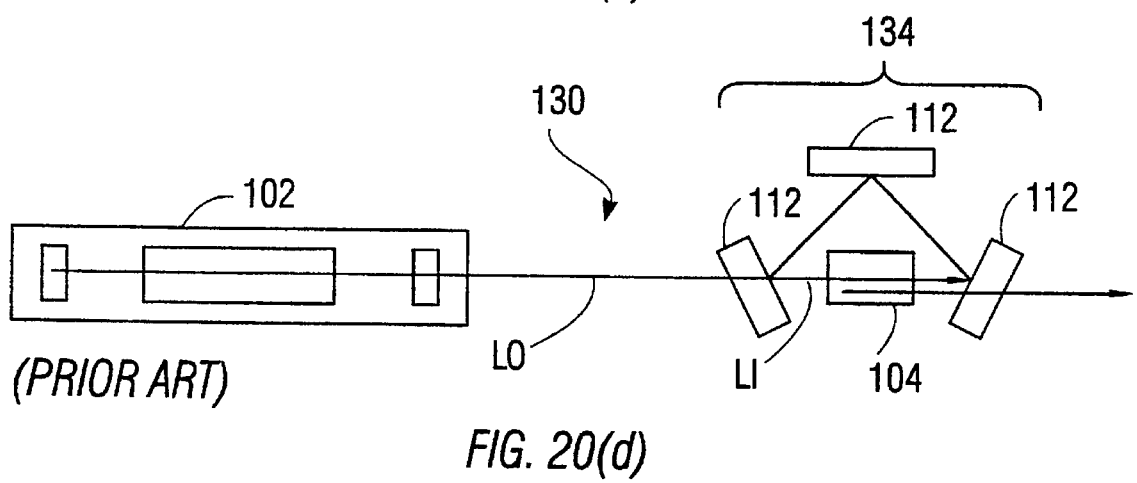
(PRIOR ART)   FIG. 20(d)

DEVICE AND METHOD FOR WAVELENGTH CONVERSION

TECHNICAL FIELD

The present invention relates generally to devices and methods for waveform conversion and, more particularly, to a device and method for waveform conversion, extracting as radiated light the light converted from an oscillation wavelength of incident light to a predetermined wavelength in a nonlinear optical effect.

BACKGROUND OF THE INVENTION

A wavelength conversion device is used to obtain ultraviolet light from continuous visible laser radiation by wavelength conversion using a nonlinear optical material having optical anisotropy, such as a uniaxial crystal. This nonlinear optical effect is a series of phenomena based on nonlinear polarization induced in the nonlinear optical material. Using a second-order nonlinear optical effect from among them, wavelength conversion (the generation of a second harmonic, added frequency, differential frequency, and so on) can be done from laser light. For example, it is usual to convert a light wavelength through second harmonic generation (SHG) with a nonlinear optical material such as a beta barium borate crystal (BBO). Thus, the simplest example of such wavelength conversion is second harmonic generation, and the frequency of the converted light is twice as much as that of the incident light and, hence, the wavelength of the converted light becomes half. Simply describing wavelength conversion of the second harmonic generation as an example, the added frequency generation of two wavelengths and differential frequency generation of the two wavelengths are also similar to this example when incident light is composed of the two wavelength components. In addition, since most nonlinear optical materials are of crystalline form, they are referred to as a crystal hereafter.

Since the amplitude of induced nonlinear polarization is proportional to the square of the amplitude of the electric field of incident light in the secondary nonlinear optical effect, the converted light power is proportional to the square of the incident light power, but the proportional constant is fairly small. Thus, generally, the light power converted with small conversion efficiency is low.

As shown in FIG. 20(a), a wavelength conversion device 100 for the simplest second harmonic generation comprises a crystal 104 located at a radiation site of laser light in a laser device 102. Laser light radiated from the laser device 102 enters the crystal 104, from which light L2 (hereafter referred to as SHG light) at twice the frequency of the incident light is radiated in the same direction as laser light L1 (hereafter referred to as excitation light) entering the crystal 104.

Although the obtained power of the SHG light depends on the characteristics of the crystal, the diameter of a light beam, the excitation light power, etc., an output power becomes small if continuous light with a small power is the excitation light since the power of the SHG light (output power) is proportional to the square of the excitation light power, as mentioned above. Usually, since the power of the laser device 102 is about 1 W, conversion efficiency in this case is very low, less than one thousandth. Hence, an external resonator is used to increase the power efficiently to convert a wavelength of laser light with a low power. Thus, to increase the power of the SHG light, it is necessary to increase the excitation light power entering the crystal. For example, if the excitation light power can be increased by 30 times in the resonator, the power of the SHG light is increased by 900 times and, hence, if the conversion efficiency is 1/2000, approximately 45 percent of the excitation light can be converted to the SHG light.

A wavelength conversion device 120 shown in FIG. 20(b) comprises an external resonator (hereafter referred to as a resonator) 114 composed of a pair of mirrors located approximately in parallel. In this type of wavelength conversion device, the wavefront of an incident light is adjusted so that the phase front of incident light coincides with a reflection plane of the mirror at the light incidence section. In the resonator adaptively disposed in this way, since wavefronts of both rays of laser light coincide with each other, the excitation light is enclosed. In this case, if the power of the excitation light L1 entering the crystal 104 is increased by 100 times as much as the power of laser light L0 through making laser light L0 radiate from the laser device 102 go back and forth within the resonator, the power of the SHG light L2 increases by 10,000 times.

However, since excitation light L1 passes the crystal 104 in both forward and backward paths within the internal region formed with the pair of mirrors 112, the SHG light is generated in both forward and backward paths, and then the obtained SHG light becomes SHG light L2 and L2a radiated from the pair of mirrors 112. Thus, only half of the converted SHG light becomes available and the remainder is wasted.

The wavelength conversion device 120 shown in FIG. 20(c) comprises a resonator 124 composed of a set of mirrors 112 and 122 located approximately in parallel. In the wavelength conversion device 120, one mirror 122 of the resonator 124 is formed so as to reflect both the excitation light and SHG light in high reflectance, the other mirror 112 is formed so as to reflect only the excitation light and transmit the SHG light, and consequently SHG light L2 is obtained. Since the converted SHG light is transmitted through the crystal 104 again, however, interference occurs with the newly generated SHG light. Since the power of the outputted SHG light changes widely due to this interference, fine adjustment becomes necessary. In addition, the characteristic change of the crystal 104 and resonator 124 due to temperature change should be avoided as much as possible. Furthermore, the resonator should control the optical path length for both wavelengths of the excitation light and SHG light. Since these restrictions and controls are generally difficult to solve, it is very difficult to use them for a wavelength conversion device.

In a wavelength conversion device 130 shown in FIG. 20(d), a ring resonator 134 is used as a resonator so as to transmit the excitation light in the same direction through the crystal 104. Since this ring resonator 134 has at least three mirrors 112 formed to reflect only the excitation light and transmit the SHG light, optical paths are formed so that the optical paths reflected by each mirror 112 are arranged in a ring and, consequently, the excitation light goes back and forth within the resonator without interference; only the excitation light in the same direction is transmitted through the crystal 104, and the SHG light in the same direction is radiated.

However, using only the ring resonator, adjustment is complicated due to the increase in the number of optical elements, and its cost is expensive due to the increase in the number of elements.

The purpose of the present invention is to provide a device and method for waveform conversion capable of efficiently converting a light wavelength in a simple structure without complicated adjustment, taking into account the above facts.

SUMMARY OF THE INVENTION

For attaining the above purpose, a wavelength conversion device according to the present invention comprises a nonlinear optical material located so as to be irradiated by light from a light radiation means that radiates light of a fundamental wavelength, having optical anisotropy, and radiating incident light of a fundamental wavelength and light of at least one converted wavelength differing from the fundamental wavelength; a resonance means consisting of a reflection-transmission means located so as to be irradiated by light from said nonlinear optical material for reflecting said light of the fundamental wavelength so that the shape of the cross section of its optical beam with respect to a plane passing through the optical axis will differ from that of the incident optical beam, and transmitting said light of the converted wavelength; and a reflection means disposed between said nonlinear optical material and said light radiation means for reflecting light reflected by said reflection-transmission means so that it will pass through an optical path approximately equal to a reference optical path through which said light of the fundamental wavelength that enters said nonlinear optical material passes and the shape of the cross section of its optical beam will be approximately equal to that of said light of the fundamental wavelength.

According to the present invention, light of the fundamental wavelength radiated from a light radiation means enters into a nonlinear optical material having optical anisotropy. The entered light of the fundamental wavelength is radiated from this nonlinear optical material and, in addition, light of at least one converted wavelength differing from the fundamental wavelength is also radiated. A resonance means consisting of a reflection-transmission means is located at a radiation section of the nonlinear optical material.

A reflection-transmission means is located so as to be irradiated by light from the nonlinear optical material for reflecting light of the fundamental wavelength so that the shape of the cross section of its optical beam with respect to a plane passing through the optical axis will differ from that of the incident optical beam, and transmitting said light of the converted wavelength. Thus, in the reflection means, only the light of the fundamental wavelength among the light arriving at the reflection-transmission means from the light radiation means as a forward path is reflected. Since the reflection optical beam in reflection has a different cross-sectional shape of an optical beam from that of the incident optical beam, the light toward the nonlinear optical material as a backward path after reflection at the reflection-transmission means does not meet conditions, such as phase matching of the nonlinear optical material. Thus, light generation of at least one converted wavelength differing from the fundamental wavelength becomes approximately zero in the backward path.

A reflection means is located so as to be irradiated by light from the nonlinear optical material for reflecting light reflected by the reflection-transmission means so that it will pass through an optical path approximately equal to a reference optical path through which the light of the fundamental wavelength entering the nonlinear optical material passes, and so that the shape of the cross section of its optical beam will be approximately equal to that of the light of the fundamental wavelength. Thus, light arriving at the reflection means as the backward path from the light radiation means is reflected so that the shape of its cross section is the same as that of the cross section of the light toward the nonlinear optical material as the forward path from the light radiation means. Hence, the light reflected after proceeding on the backward path from the reflection-transmission means is added to the incident light from the light radiation means at the reflection means, and this added light proceeds toward the nonlinear optical material. Accordingly, since the light not converted to the light of the converted wavelength in proceeding on the forward path among the light of the fundamental wavelength proceeds again on the forward path, the nonlinear optical material generates, for example, the light of at least one converted wavelength differing from the fundamental wavelength only in one direction, the forward path.

In said reflection means, it is possible to reflect the light reflected by the reflection-transmission means in a convergent direction. Thus, when light of the fundamental wavelength from the light radiation means is radiated in a beam-condensing site so that the nonlinear optical material efficiently converts the wavelength, the reflected light after proceeding on the backward path from the reflection-transmission means can be added to the light entering from the light radiation means through reflecting the light reflected by the reflection-transmission means in the reflection means. In addition, in said reflection-transmission means, it is possible to reflect the fundamental wavelength in a divergent direction. Thus, if light is radiated in a beam-condensing site from the light radiation means, the light diverging from the nonlinear optical material arrives at the reflection-transmission means. Hence, if the reflection-transmission means reflects the light of the fundamental wavelength in a divergent direction, the light that does not meet conditions, such as phase matching of the nonlinear optical material, can be guided to the reflection means at high speed without coinciding with the shapes of cross sections.

The reflection-transmission means and reflection means in said resonance means each can comprise a curved surface such as a spherical surface, and the focal length and reflection optical path of each curved surface are approximately equal. In this structure, since a resonance means can be composed as a so-called confocal resonator, entered light can be enclosed, the light going back and forth in the resonance means.

Furthermore, at least one of said reflection-transmission means and said reflection means in said resonance means can comprise a transmission member that radiates light entering from a specified direction and also radiates, as reflected light, light entering from a direction differing from the specified direction; a reflection member reflecting light from the specified direction which is radiated from the transmission member to guide it to said transmission member; and an odd number of beam-condensing sites where light is condensed and located between said reflection member and said transmission member, said resonance means having an even number of beam-condensing sites inside. This beam-condensing site means the beam-condensing site where light is condensed between said reflection member and said transmission member when at least one of said reflection-transmission means and said reflection means comprises a transmission member, such as a lens and a reflection surface that radiates light entering from a specified direction and also radiates, as reflected light, light entering from a direction differing from the specified direction; and a reflection member, such as a reflection surface reflecting light from the specified direction which is radiated from the transmission member to guide it to said transmission member. In this structure, since a resonator can be composed of a so-called double confocal resonator, entered light can be enclosed, the light going back and forth in the resonance means if the optical axis of the incident light and so on is slightly off center.

Still more, said resonance means can comprise a reflection-transmission means located so as to be irradiated by light from said nonlinear optical material for reflecting said light of the fundamental wavelength so that the shape of the cross section of its optical beam with respect to a plane passing through the optical axis will differ from that of an incident optical beam and transmitting said light of the converted wavelength; a reflection means for reflecting light so that it will pass through an optical path approximately equal to a reference optical path through which said light of the fundamental wavelength that enters said nonlinear optical material passes, and the shape of the cross section of its optical beam will be approximately equal to that of said light of the fundamental wavelength; and a guide means for guiding light reflected by said reflection-transmission means to said reflection means. In this structure, since a resonator can be composed of a so-called ring resonator, light goes back and forth in the resonance means, and an optical path of the forward path is different from that of the backward path. Hence, the nonlinear optical material generates, for example, the light of at least one converted wavelength differing from the fundamental wavelength only in one direction, the forward path.

The invented wavelength conversion method converts said light of the fundamental wavelength to said light of the converted wavelength using a nonlinear optical material having optical anisotropy and radiating incident light of a fundamental wavelength and light of at least one converted wavelength differing from the fundamental wavelength. Light of the fundamental wavelength enters the nonlinear optical material, the section irradiated by light from said nonlinear optical material reflects said light of the fundamental wavelength so that the shape of the cross section of its optical beam with respect to a plane passing through the optical axis will differ from that of an incident optical beam and transmits said light of the converted wavelength. The section near said nonlinear optical material reflects light reflected by said section irradiated by light from said nonlinear optical material so that it will pass through an optical path approximately equal to a reference optical path through which said light of the fundamental wavelength that enters said nonlinear optical material passes, and the shape of the cross section of its optical beam will be approximately equal to that of said light of the fundamental wavelength.

BRIEF DESCRIPTION OF THE DRAWING

FIG. 20 is a schematic diagram showing a conventional wavelength conversion device where (a) is a wavelength conversion device with a crystal in a single path, (b) is a wavelength conversion device using a circulation-type of resonator, (c) is a modified example of (b), and (d) is a wavelength conversion device using a ring resonator.

DESCRIPTION OF THE PREFERRED EMBODIMENT

Referring to the figures, the first embodiment according to the present invention will be discussed hereinafter. This embodiment applies the present invention to a wavelength conversion device generating SHG light using a Fabry-Perot resonator.

Figure 1:
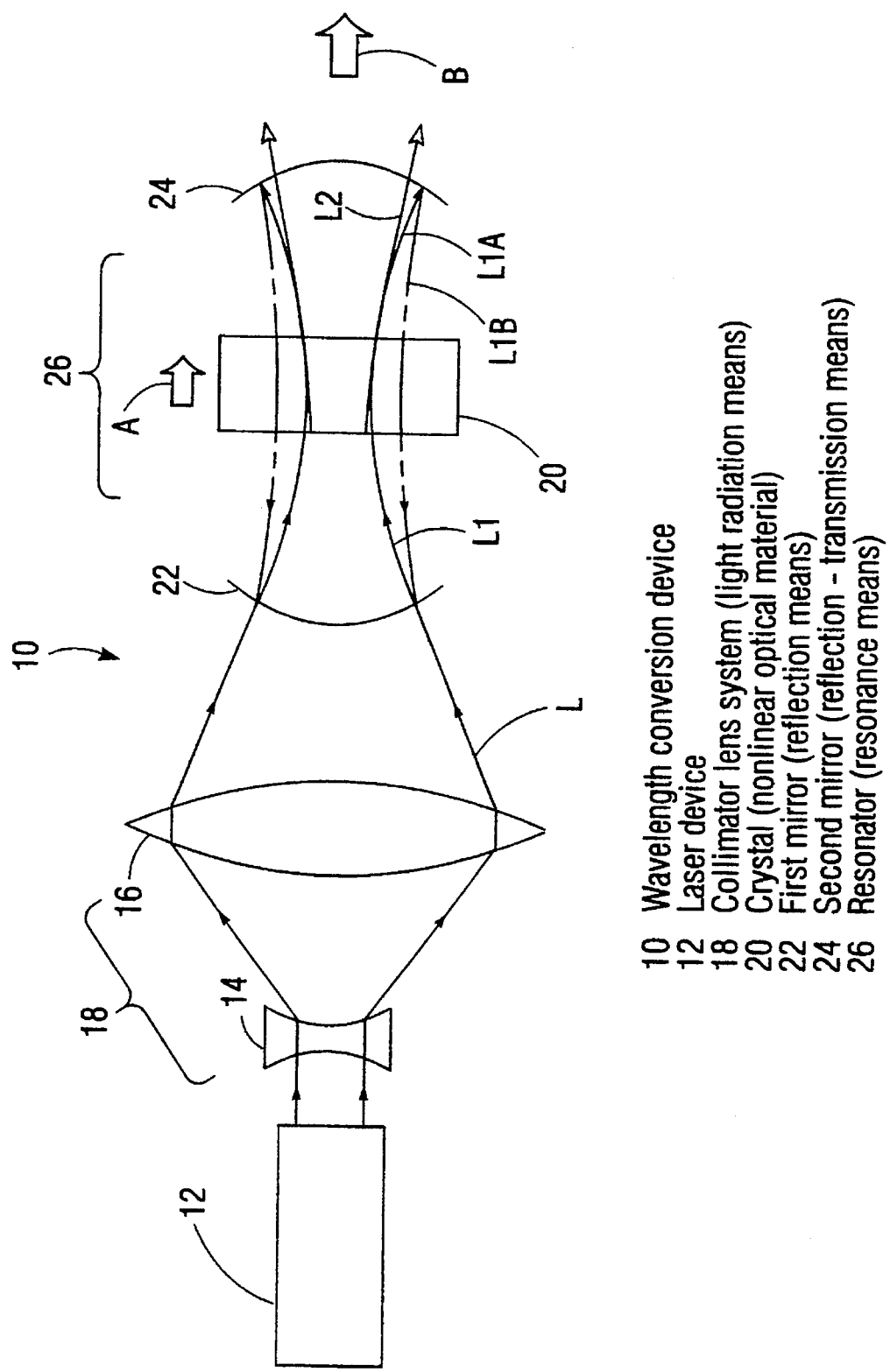
FIG. 1 is a schematic diagram showing the entire structure of a wavelength conversion device according to a first embodiment of the present invention.

As shown in FIG. 1, a wavelength conversion device 10 of the first embodiment comprises a laser device 12 radiating light of a predetermined wavelength, e.g., a continuous laser beam at 1064 nm and 200 mW. A collimator lens system 18 is located at a radiation section of the laser device 12. This collimator lens system 18 comprises a concave lens 14 as a beam-diverging means and a convex lens 16 as a beam-condensing means, which are located in the order of the concave lens 14 and the convex lens 16. A light beam (laser light) radiated from the laser device 12 is condensed by the convex lens 16 after diverging by the concave lens 14. This collimator lens system 18 is for adjusting the wave surface of light and the beam diameter of a light beam, and beam-condensing sites, called beam waists where light beams are condensed, are formed at the radiation section of the collimator lens system 18. The light radiation means comprises this laser device 12 and collimator lens system 18.

A resonator 26 is located at a radiation section of a light beam in the collimator lens system 18. This resonator 26 comprises the first mirror 22 and second mirror 24 disposed in this order from the radiation section of a light beam in the collimator lens system 18. The first mirror 22 and second mirror 24 are formed with spherical mirrors having the same radius of curvature. Thus, focal lengths of the first mirror 22 and second mirror 24 coincide. The resonator 26 of this embodiment forms a so-called confocal resonator wherein the focus and center of curvature of the mirror 22 are equal to those of the mirror 24. This resonator 26 is disposed so that beam-condensing sites, called beam waists where light beams are condensed, are located near the focal point.

In addition, in this embodiment, the radius of curvature of the first mirror 22 and second mirror 24 exceeds the curvature of the wavefront of the light beam radiated from the collimator lens system 18. Therefore, when a light beam is reflected from the mirrors 22 and 24, the curvature of its wavefront is changed.

The crystal 20 as a nonlinear optical material is located near said beam-condensing sites, called beam waists, so that the beam waists are positioned inside the crystal 20. Since the crystal 20 has a sufficiently large receptive angle, the SHG light of a converted wavelength obtained from a light beam of a fundamental wavelength (excitation light) in the nonlinear optical effect is output efficiently when the light beam coincides with the large acceptance angle in the crystal 20.

The operation of the wavelength conversion device 10 of this embodiment will be discussed together with the behavior of a light beam hereinafter. Light beam L radiated from a collimator lens system 18 arrives inside the crystal 20 through a first mirror 22, the beam diameter gradually decreasing, and then beam waists are formed in the crystal 20. In addition, light beam L passing the first mirror 22 acts as excitation light L1 so as to obtain the SHG light of a converted wavelength in the crystal 20. In the crystal 20, SHG light L2 is generated by the nonlinear optical effect. Generated SHG light L2 is used as output light (light in the direction shown by the white arrow B in FIG. 1) through the second mirror 24. Residual excitation light L1a not converted to SHG light L2 is reflected and the radius of the curvature of its wavefront is changed at the second mirror 24. When the radius of curvature of its wavefront is changed, it is changed so as to diverge in the divergent direction, its beam diameter not being changed in the shrinking direction. Excitation light L1b, the radius of curvature of its wavefront changed, arrives at the first mirror 22 through the crystal 20. The radius of the wavefront of excitation light L1b is changed so as to coincide with that of light L (i.e., excitation light L1) radiated from the collimator lens system 18, and excitation light L1b is reflected at the first mirror 22. Excitation lights L1 and L1a arrive at the crystal 20. In this manner, excitation light circulates in the resonator.

Figure 2:
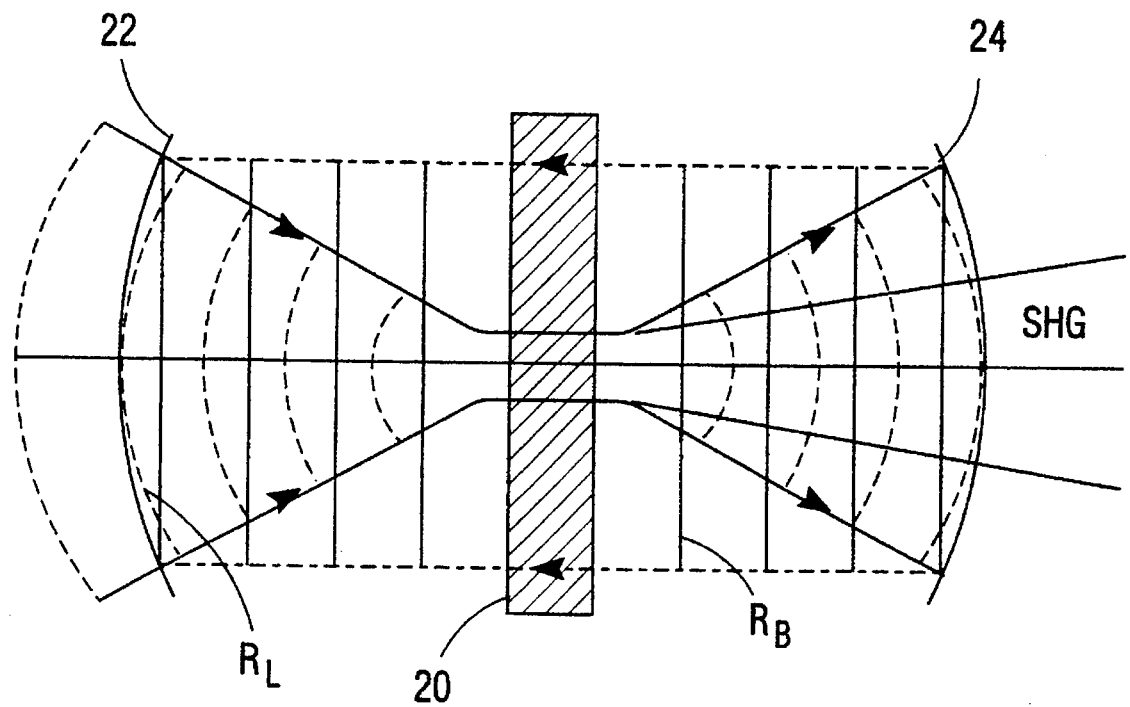
FIG. 2 is an image drawing showing wavefronts (equiphase planes) of a light beam in a resonator.

At the first mirror 22 and second mirror 24, radius $R_L$, of curvature of the wavefront of incident light beam L is smaller than each radius of curvature of the first mirror 22 and second mirror 24 (refer to FIG. 2). Thus, radius $R_B$ of the curvature of the wavefront of light reflected by the second mirror 24 is larger than radius $R_L$ of the curvature of the wavefront of an incident light beam. Hence, under conditions of the beam diameter of the light beam and the resonator, the beam diameter at the beam waist on the forward path (solid line in FIGS. 1 and 2) is different from that on the backward path (alternate long and short dash lines in FIGS. 1 and 2). If the crystal 20 is located at the position of the beam waist and SHG light is generated, the power of the SHG light generated on the forward and backward paths is inversely proportional to the area of the beam diameter at the beam waist of each excitation light since the acceptance angle of the crystal is sufficiently large. Thus, if the resonator and the light beam are set as this embodiment that the beam diameter at the beam waist on the forward path is different from that on the backward path, power to generate the SHG light (harmonic output) concentrates upon only the excitation light in the direction (shown by white arrow A) where a light beam with a small beam diameter proceeds. For example, if the ratio of the beam diameters on the forward and backward paths is 1:3 (1:5), the ratio of the SHG light (harmonic output) becomes 9:1 (25:1), and thus 90 percent of the converted power concentrates upon one direction.

In this manner in accordance with the wavelength conversion device of this embodiment, since a resonator capable of a confocal resonator is used as an external resonator for wavelength conversion, the radius of curvature of a wavefront of a light beam reflected by a mirror toward a backward path can be done so as to be made different from those of the incident light and excitation light and, hence, the SHG light generated passing through a crystal located near a beam waist concentrates only upon the forward path. Therefore, the wavelength of light can be efficiently converted in a simple structure without complicated adjustment simply through adjusting the incident light beam so that the radius of curvature of the incident light beam is different from, that is, smaller than, that of a curved surface with a crystal disposed near a focal point using a resonator comprising a pair of curved surfaces functioning as a confocal system.

The manner in which a light beam at wavelength λ is circulated as excitation light in a confocal resonator of this embodiment will be discussed hereinafter.

Figure 3:
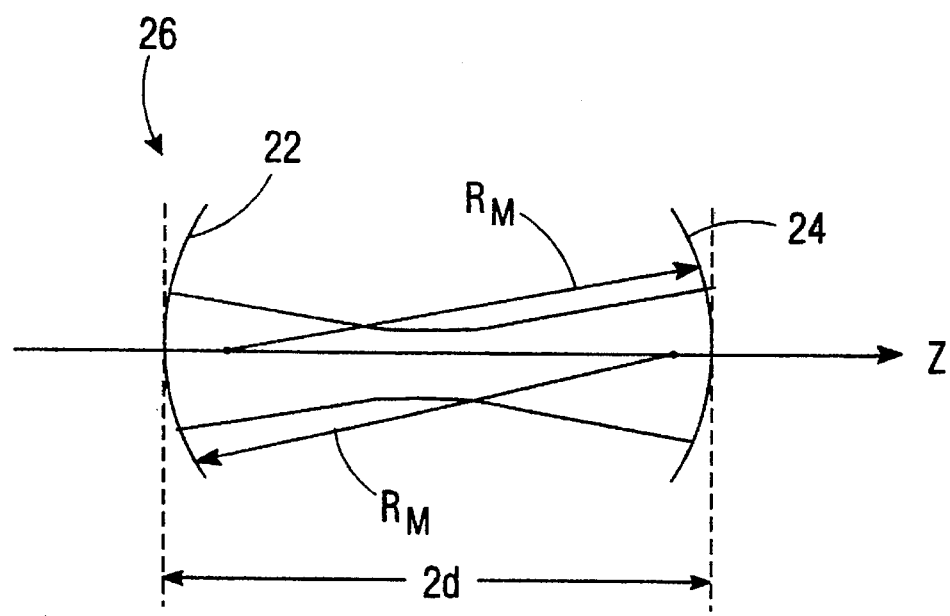
FIG. 3 is a schematic diagram of a resonator with two curved surfaces.

As shown in FIG. 3, it is assumed that, in a resonator 26, two mirrors 22 and 24 with a radius of curvature of $R_M$ are located face to face at distance 2d. If light beam L at wavelength λ entering the resonator 26 proceeds along the Z axis, it is possible to represent the change of a beam diameter ω(z) and the radius of curvature of a wavefront R(z) of a light beam at wavelength λ proceeding along the Z axis, at a position z on the Z axis, using a ray matrix. For example, if a light beam proceeds from position $z_1$ to another position $z_2$ on the Z axis, a ray matrix can be expressed with an ABCD matrix as shown in Eq. 1 as follows:

$$\begin{bmatrix} A & B \\ C & D \end{bmatrix} \quad (1)$$

Here, if a refractive index of a medium where the light beam proceeds is n and complex quantity q(z) at position z is defined in Eq. 2, as follows, comprising a real part and an imaginary part, complex quantity $q(z_2)$ at position $z_2$ can be expressed in Eq. 3.

$$1/q(z) = 1/R(z) - i\{\lambda/\pi n\omega(z)^2\} \quad (2)$$

$$q(z_2) = \frac{A \cdot q(z_1) + B}{C \cdot q(z_1) + D} \quad (3)$$

Here, it is considered that a light beam diameter increases in a divergent direction after decreasing toward a convergent direction along the proceeding direction, and it is assumed that the beam diameter is $\omega_x$ at position $z=-d$, minimum beam diameter $\omega_0$ at position $z=0$, and the beam diameter is $\omega_1$ at position $z=d$. Then, if the beam passes in a uniform medium to distance $\xi$, a ray matrix can be expressed in Eq. 4 as follows:

$$\begin{bmatrix} 1 & \xi \\ 0 & 1 \end{bmatrix} \quad (4)$$

Thus, it is assumed that complex quantity $q(0)=q_0$ at position $z=0$, and the above Eq. 3 can be expressed in Eq. 5:

$$q(\xi)=q_0+\xi \quad (5)$$

At position $z$ (=0), the beam diameter is minimum $\omega_0$ and, hence, the radius of curvature $R(0)$ is infinite. Thus, because the real part of the above Eq. 2 becomes 0, complex quantity $q_0$ becomes a pure imaginary number $(1/q_0=-i\lambda/\pi n\omega_0^2)$ and, hence, complex quantity $q(\xi)$ in the distance $\xi$ can be expressed in Eq. 6:

$$\frac{1}{q(\xi)} = \frac{\xi(\lambda/\pi n\omega_0)^2 - i\lambda/\pi n\omega_0^2}{1+\xi^2(\lambda/\pi n\omega_0)^2} \quad (6)$$

Then, since the radius of curvature $R(\xi)$ and beam diameter $\omega(\xi)$ at distance $\xi$ are a case in which the real part and imaginary part of Eq. 2 and Eq. 6 correspond, each can be expressed in Eqs. 7 and 8.

$$\frac{1}{R(\xi)} = \frac{\xi(\lambda/\pi n\omega_0^2)^2}{1+\xi^2(\lambda/\pi n\omega_0^2)^2} \quad (7)$$

$$\omega(\xi)^2 = \omega_0^2 + \frac{\xi^2\lambda^2}{\pi^2 n^2 \omega_0^2} \quad (8)$$

Thus, the relationship shown in Eq. 9, as follows, can be obtained from Eqs. 7 and 8:

$$\frac{1}{R(\xi)} = \frac{\omega(\xi)^2 - \omega_0^2}{\omega(\xi)^2 \xi} \quad (9)$$

Here, if position $z$ is $d$ and beam diameter $\omega(d)=\omega_1$, and if the beam diameter at the position $z(=0)$ is the minimum one, with the above Eq. 8 beam diameter $\omega_0$ at the position $z(=0)$ can be expressed in Eq. 10:

$$(\omega_{0+})^2 = \frac{\omega_1^2 \pm \sqrt{(\omega_1^4 - 4d^2\lambda^2/\pi^2 n^2)}}{2} \quad (10)$$

In addition, the radius of curvature $R(d)$ at position d can be expressed in Eq. 11, as follows, through Eq. 7:

$$\frac{1}{R_+} = \frac{-\omega_1^2 \pm \sqrt{(\omega_1^4 - 4d^2\lambda^2/\pi^2 n^2)}}{2\omega_1^2 d} \quad (11)$$

However, it is assumed that the sign of radius R of curvature of a wavefront is minus when the center of curvature is on the left-hand side.

A mirror having radius $R_M$ of the curvature is necessary to obtain a light beam of radius $R_-$ of the curvature proceeding in reverse direction from a light beam of radius $R_-$ of the curvature. Radius $R_M$ of the curvature of this mirror can be expressed in Eq. 12 as follows:

$$\begin{aligned} 2/R_M &= 1/R_+ + 1/R_- \quad (12) \\ &= 1/d \\ R_M &= 2d \end{aligned}$$

A resonator of the above embodiment is a confocal resonator which is symmetrical in width. Hence, since the above Eq. 12 does not include a wavelength, refractive index, resonator length, input beam diameter ($\omega_1$), and so on as conditions, this shows that in a confocal resonator a shape of a light beam proceeding to the left-hand side (forward path) is generally different from that of a light beam proceeding to the right-hand side (backward path) and, namely, their sizes are different. In other words, it is understood, since a ray matrix for a light beam once circulating a confocal resonator can be expressed in Eq. 13:

$$\begin{bmatrix} -1 & 0 \\ 0 & -1 \end{bmatrix} \quad (13)$$

Therefore, the output value of complex quantity q against any input value of complex quantity q is the same in regard to a ray matrix having factors A, B, C, and D through Eq. 3. Thus, a light beam entering a resonator does not depend on the beam diameter or the radius of curvature of a wavefront at an incident surface, and a beam circulated once is built up to an initial beam (incident beam).

Figure 4:
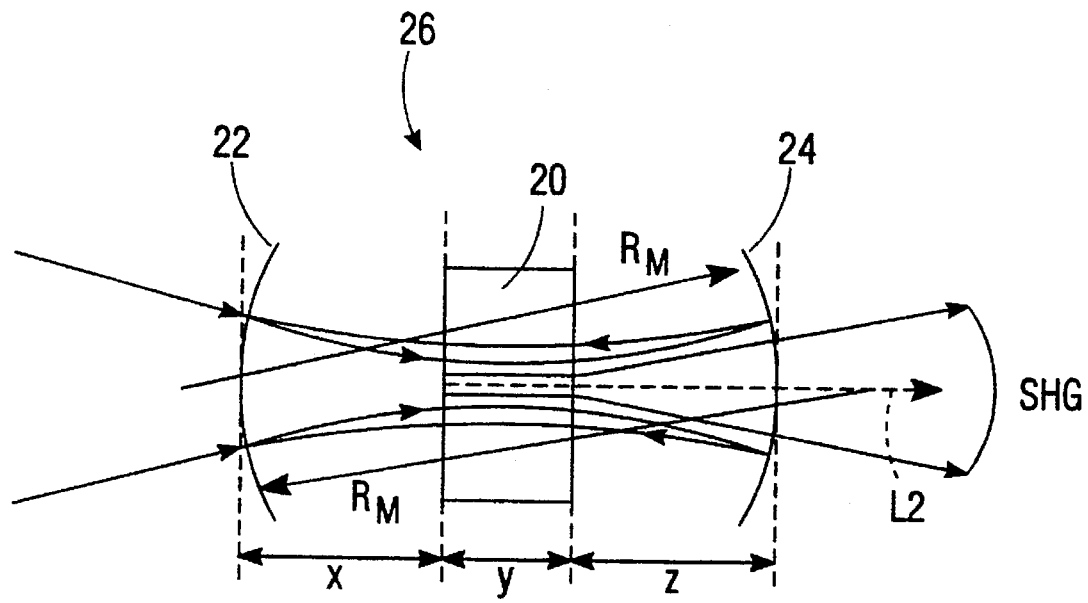
FIG. 4 is an image drawing showing an example of a confocal resonator.

As an actual example of a confocal system configuration, as shown in FIG. 4, a resonator 26 comprises a first mirror 22 of radius $R_M$ of a curvature located at distance x from one side of a parallel flat shape of a crystal 20 at thickness y, and a second mirror 24 of radius $R_m$ of a curvature located at distance z from another side of a crystal 20. Then, if refractive index $n_2$ of the crystal 20 is different from refractive index $n_1$ of a medium between the mirrors and the crystal, refractive index n is regarded as $n=n_2/n_1$, considering refraction at a boundary, and the relationship between radius $R_m$ of a curvature and distance x and z is expressed in Eq. 14 as follows $$R_M=x+y/n+z \quad (14)$$

Figure 5:
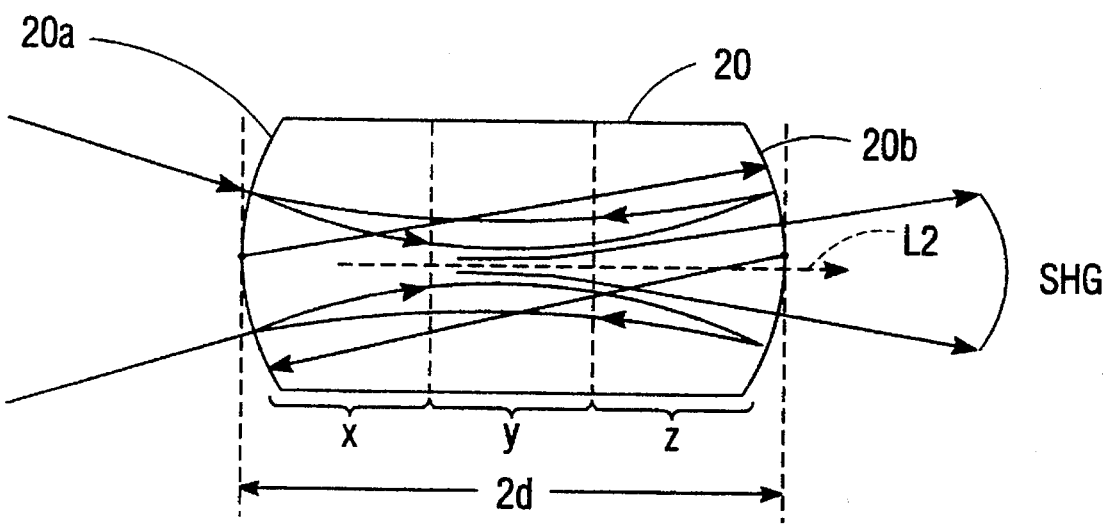
FIG. 5 is an image drawing showing a resonator unifying a crystal and mirrors.

In addition, although in the above embodiment a case is shown in which a crystal 20 is located near the focal points of mirrors 22 and 24 having the same radius of curvature, the present invention is not limited to locating the crystal in the resonator comprising mirrors externally and, hence, it is possible to form a resonator 26 with only one machined crystal 20. Thus, it is possible to form a resonator with only a crystal 20 through polishing and coating a light incidence section and a light radiation section of the crystal 20 so as to get each radius $R_M$ of a curvature. For example, as shown in FIG. 5, it is possible to form a monolithic confocal resonator through polishing a light incidence section 20a and a light radiation section 20b of the crystal so as to get each radius $R_M$ of a curvature and make the center of curvature a center of the two sections of the resonator.

In this case, a light beam passing through the resonator always propagates in the crystal but, since the crystal has conditions for phase matching, the SHG light is generated only when the conditions for phase matching are fulfilled. The effective section (distance) of the crystal generating this SHG light coincides with thickness y shown in FIG. 4.

In addition, although a resonator can be formed with only a crystal through processing the crystal itself as mentioned above, the spherical polishing of a crystal is not easy and the crystal has no other use beside the effective section (y) effectively generating SHG light. For this reason, it is effective to form a central section (y) with only a crystal and to compose a block (x and z) being a mirror with a transparent medium such as glass having a similar refractive index not using a monolithic crystal. This glass is generally easy to use in spherical polishing. In this manner, since the necessary volume of a crystal can be reduced, the crystal can be effectively used. Furthermore, the crystal may be in only flat polishing, and glass may be used in easy spherical polishing. For this reason, the manufacturing of a resonator becomes easy.

The second embodiment will be discussed next. This is an application of the present invention to a double confocal resonator. However, since a wavelength conversion device of the second embodiment has an approximate similar configuration as the above embodiment, only the resonator in a different configuration will be discussed.

Figure 6:
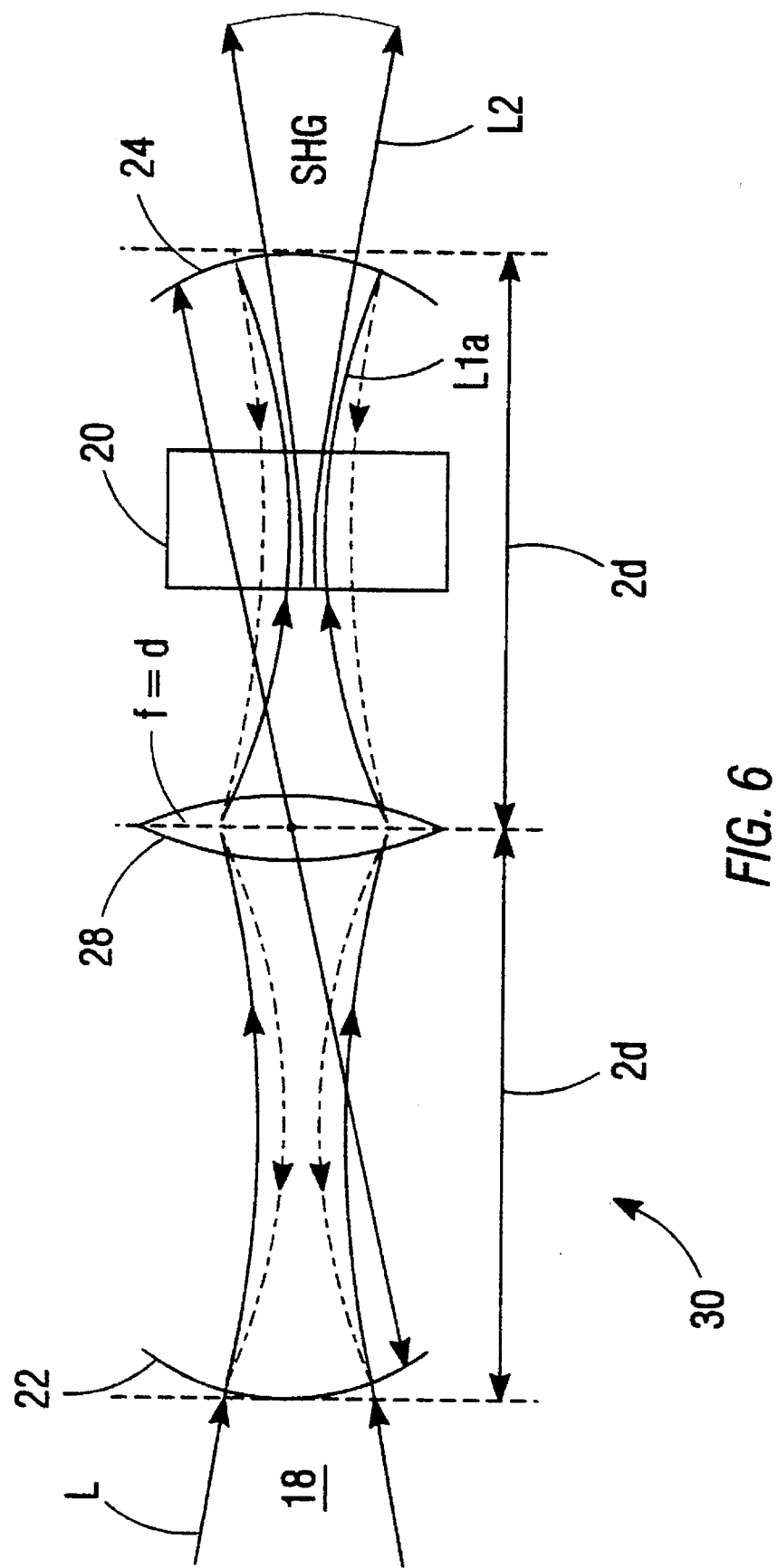
FIG. 6 is an image drawing showing the entire structure of a double confocal resonator according to a second embodiment.

As shown in FIG. 6, a resonator 30 is located at the radiation section of a light beam in a collimator lens system 18. A resonator 30 of this embodiment comprises a first mirror 22, second mirror 24, and lens 28 at focal length d. In the resonator 30 of this embodiment, the first mirror 22 as a reflection member and the second mirror 24 as a reflection-transmission member are disposed so that the positions of their centers of curvature coincide with each other; the lens 28 as a transmission member is disposed at this center of curvature, and a so-called double confocal resonator is formed. In addition, the crystal 20 is disposed near a beam-condensing site of the lens 28. The first mirror 22 and lens 28 compose a reflection means.

The operation of a wavelength conversion device of the embodiment will be discussed next together with the behavior of a light beam. Light beam L radiated from a collimator lens system 18 passes through a first mirror 22, the beam diameter gradually decreasing, and arrives at the lens 28 in diverging after once being condensed. The lens 28 condenses the incident light beam, enters the crystal 20 while the beam diameter is gradually reduced, and then beam waists are formed in the crystal 20. In the crystal 20, SHG light L2 is generated by the nonlinear optical effect. Generated SHG light L2 passes through the second mirror 24. Residual excitation light L1a not converted to SHG light L2 is reflected and the radius of curvature of its wavefront is changed at the second mirror 24. When the radius of curvature of its wavefront is changed, it is changed so as to diverge in the divergent direction, its beam diameter not being changed in the shrinking direction. Excitation light L1b, the radius of curvature of its wavefront having been changed, arrives at the lens 28 through the crystal 20. The lens 28 condenses the incident light beam and radiates it to the first mirror 22. At the first mirror 22, the incident light beam is reflected and a radius of curvature of its wavefront is changed. Thus, the radius of curvature of the wavefront of excitation light L1b is changed so as to coincide with that of light L (i.e., excitation light L1) radiated from the collimator lens system 18. Excitation light L1 and L1a are condensed with the lens 28 and arrive at the crystal 20. In this manner, excitation light circulates in the resonator 30.

Here, although in the above embodiment the center of a proceeding light beam should coincide with the central axis of a resonator, the ABCD matrix for a circulating beam becomes a unit matrix after two times of circulation if the center of a light beam does not coincide with the central axis of a resonator. Hence, the light beam completely coincides with an incident light beam each even time of circulation. However, odd times of circulation cause light power loss because the two beams do not coincide with each other.

For this reason, in the resonator of the embodiment 30 (double confocal resonator, FIG. 6), a ray matrix regarding a light beam at one time of circulation can be expressed as the unit matrix shown in Eq. 15, as follows:

$$\begin{bmatrix} 1 & 0 \\ 0 & 1 \end{bmatrix} \quad (15)$$

When the optical axis of an incident light beam does not coincide with the central axis of a resonator in a confocal resonator, a light beam circulating once in the resonator does not coincide with an incident light beam completely and, hence, power loss increases. However, both beams can completely coincide with each other in this double confocal resonator if the two optical axes do not coincide.

In both cases, however, of the confocal resonator 26 of the first embodiment and double confocal resonator 30 of the second embodiment, the minimum beam diameters of a forward path and a backward path are $\omega_{0+}$ and $\omega_{0-}$ given by Eq. 10. Hence, if a receptive angle of phase matching of a crystal is sufficiently large, the power ratio of SHG light generation on the forward and backward paths is $(\omega_{0+}/\omega_{0-})^2$. For this reason, using Eq. 10 above, the power ratio of SHG light generation can be expressed in Eqs. 16 to 18 as follows:

$$(\omega_{0+}/\omega_{0-})^2 = \frac{\omega_1 + \sqrt{(\omega_1^4 - 4d^2\lambda^2/\pi^2n^2)}}{\omega_1 - \sqrt{(\omega_1^4 - 4d^2\lambda^2/\pi^2n^2)}} \quad (16)$$

$$= \{\beta + \sqrt{(\beta^2 - 1)}\}^2 \quad (17)$$

However, $$\beta = \pi n \omega_1^2 / 2d\lambda \quad (18)$$

For example, if beam diameter $\omega_1=1$ mm, focal length $d=100$ mm, refractive index $n=1$, and wavelength $\lambda=500$ nm, then using Eqs. 16 to 18 above, the power ratio $(\omega_{0+}/\omega_{0-})^2 \approx 60^2$ if $\beta=31$ and, hence, the power ratio of the SHG light is 3600:1. Consequently, SHG light output approximately complete in one way can be obtained.

Figure 7:
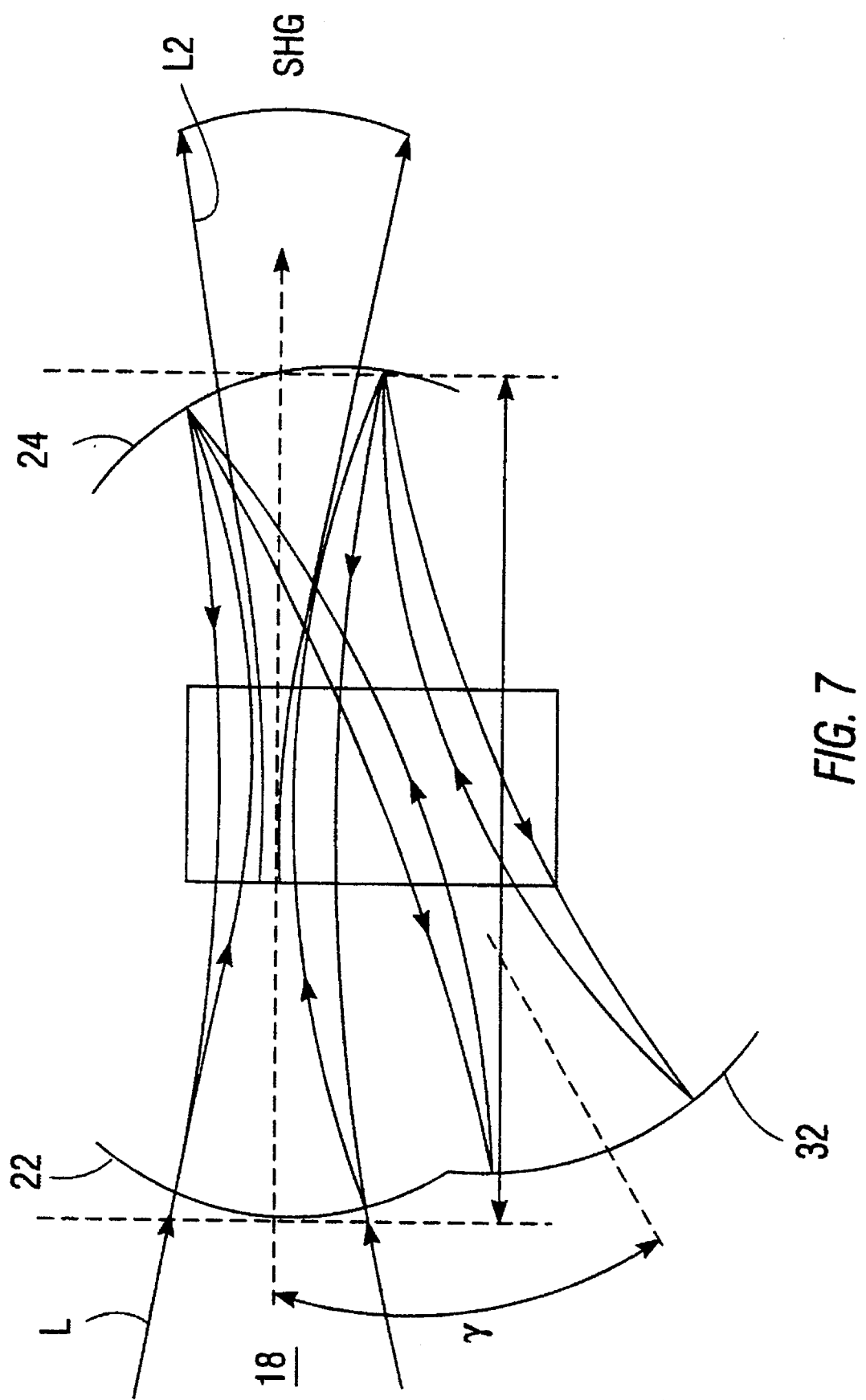
FIG. 7 is a schematic diagram showing a double confocal resonator using reflection mirrors.

In an actual example of a double confocal system configuration, as shown in FIG. 7, a first mirror 22 and a second mirror 24 are disposed in this order at the radiation section of a light beam in a collimator lens system 18. This second mirror 24 is disposed so that an incident optical axis and a reflection optical axis are polarized in angle γ. A third mirror 32 is disposed at the reflection section of the second mirror 24. It is assumed that the first mirror 22, second mirror 24, and third mirror 32 have the same radius of curvature, and that radius $R_M$ of a curvature of mirrors and their distances fulfill conditions similar to those in Eq. 14 above. A crystal 20 is disposed in fulfill conditions similar to those in Eq. 14 above. A crystal 20 is disposed in the light-condensing position of these mirrors, namely, the position where a beam waist becomes the minimum beam diameter. In this case, a light beam passing through the resonator always propagates in the crystal but, since the crystal has conditions for phase matching, the SHG light is efficiently generated through adjusting it simply against a light beam from the first mirror 22 to the crystal 20 so that the conditions of phase matching coincide only when the conditions for phase matching are fulfilled. Since a light beam entering the third mirror 32 and a light beam reflected by the third mirror 32 do not fulfill the conditions of phase matching, the SHG light cannot be efficiently generated and, hence, the SHG light can be efficiently generated with only a light beam reflected by the first mirror.

Figure 8:
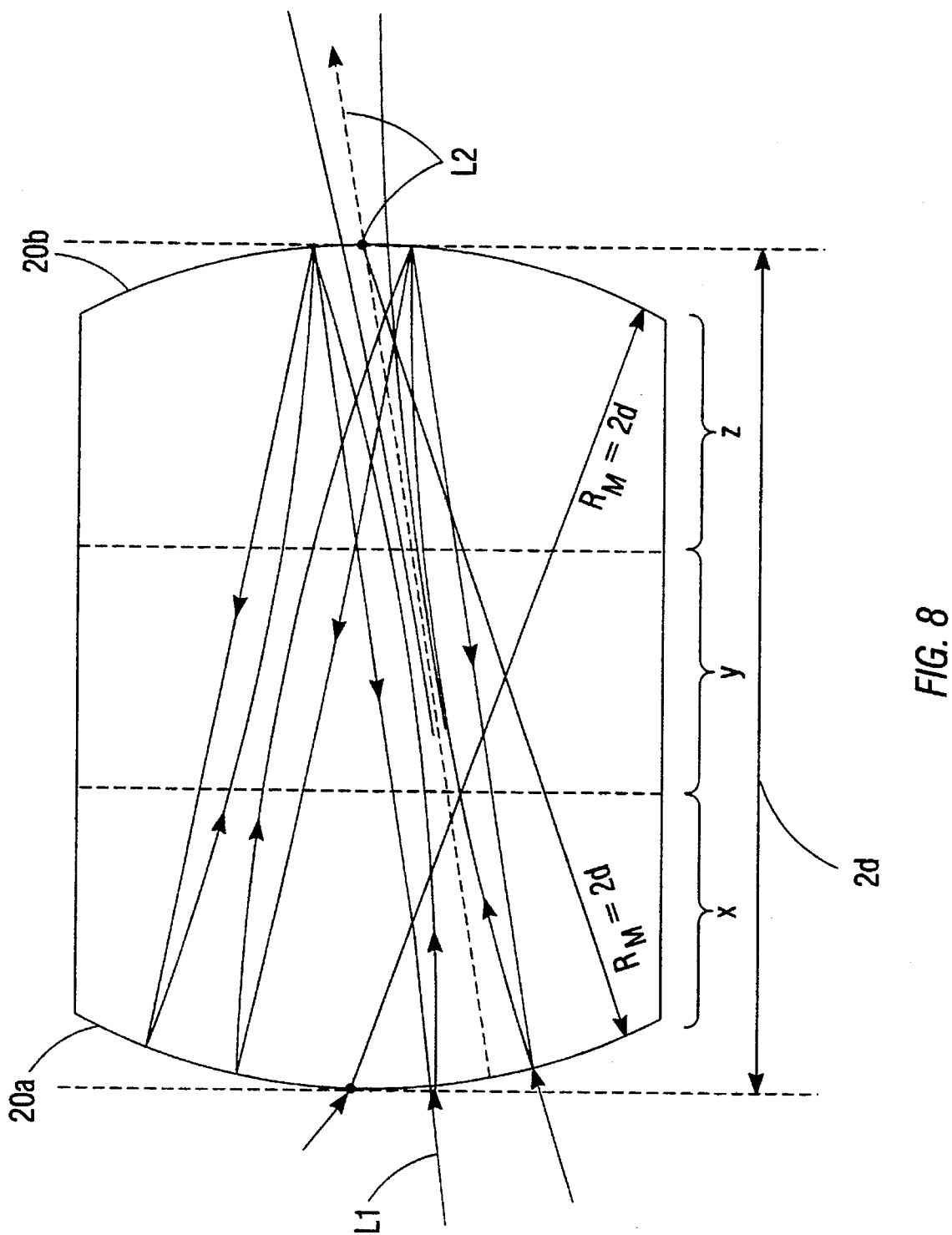
FIG. 8 is an image drawing showing a double confocal resonator comprising only a crystal.

In addition, although in the above embodiment a case is shown in which a crystal 20 is located near focal points of mirrors having the same radius of curvature, the present invention is not limited to locating the crystal in the resonator comprising mirrors externally and, hence, it is possible to form a resonator 26 with only machined crystal 20. Thus, as similar to the first embodiment, it is possible to form a resonator with only a crystal 20 through polishing and coating a light incidence section and a light radiation section of the crystal 20 so as to get each radius $R_M$ of a curvature. For example, as shown in FIG. 8, the polishing of a light incidence section 20a and a light radiation section 20b of the crystal 20 can be done so as to get each radius $R_M$ of curvature and make the center of curvature a center of the two sections of the resonator. This is a similar configuration as FIG. 5 in the first embodiment. The difference between the resonator in FIG. 5 and resonator in FIG. 8 is the direction of phase matching.

Furthermore, it is also possible to form a central section (y) with only a nonlinear optical crystal and to compose a peripheral part with a medium such as glass having a similar refractive index, not using a monolithic crystal. Moreover, it is also effective to form a central section (y) with only a crystal and to compose a block (x and z) being a mirror with a transparent medium such as glass having a similar refractive index, not processing only a crystal as mentioned above.

Figure 9:
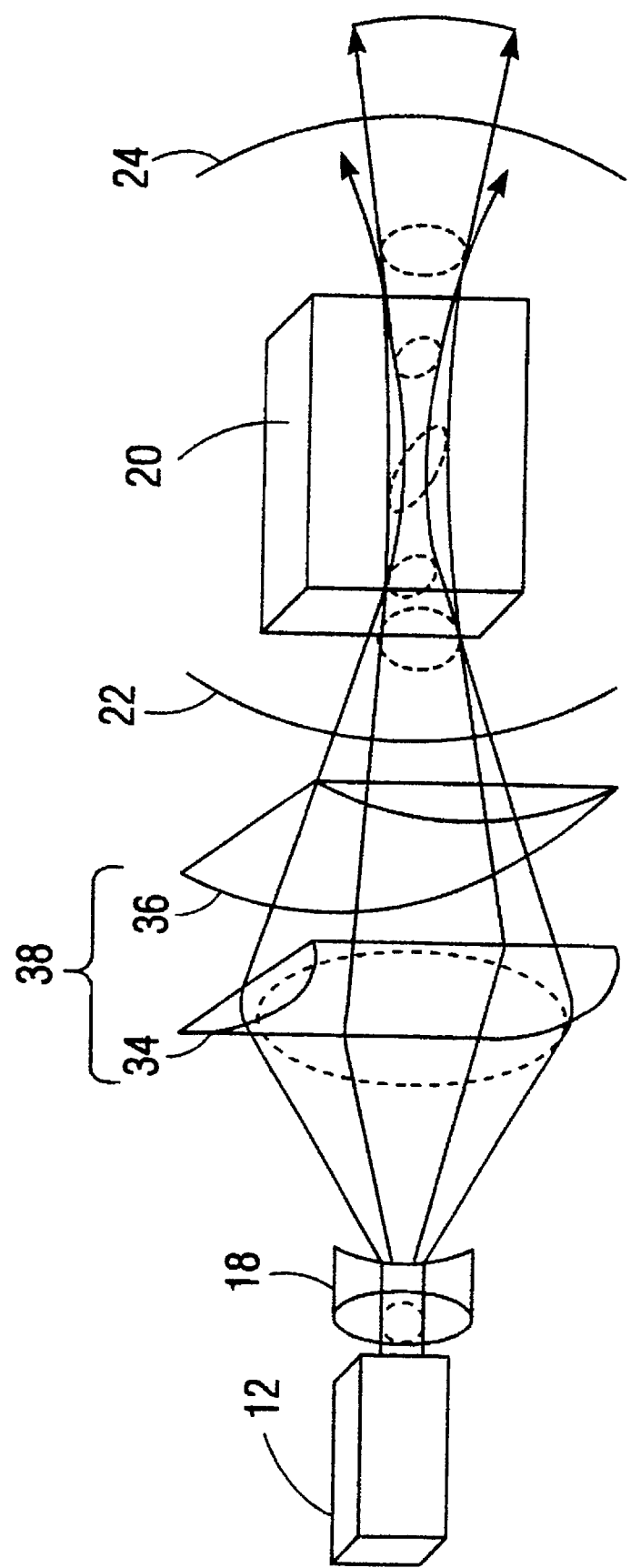
FIG. 9 is a schematic diagram showing a configuration example optionally setting the shape of a light beam.

In the above first and second embodiments, although the shapes of beam diameters are not discussed, the shapes of beam diameters possible to be applied are not specified. Thus, in a confocal resonator and double confocal resonator, a light beam (Gaussian beam) circulated once in the resonator has the completely same beam diameter and radius of curvature as an incident light beam. This characteristic is applicable to the case in which the radius of curvature of a light beam in the vertical direction is different from the radius of curvature of a light beam in the horizontal direction, that is, an ellipse beam. Thus, this is applicable to the case in which an ellipse focus is formed in a crystal. FIG. 9 shows an example of a light condensing method, wherein a cylindrical lens system 38 is located between a laser device 12 and crystal 20 so as to change a shape of a beam diameter. This cylindrical lens system 38 can comprise, for example, a first cylindrical lens 34 and a second cylindrical lens 36 whose axis line crosses the axis line of the first cylindrical lens 34. By setting the lens power of the first cylindrical lens 34 and second cylindrical lens 36, the shape of a beam diameter of a beam waist can be set in a predetermined shape.

In this manner, in the above embodiment, using a simple structure of a Fabry-Perot resonator, the SHG light in a single direction can be generated through changing curvature of wavefronts of incident light and radiated light by mirrors. Hence, although this is a Fabry-Perot resonator, there is no instability-by-interference effect occurring due to a light beam on a forward path and a backward path, because there is no turning of the SHG light in the resonator. In addition, compared to a conventional wavelength conversion device using a ring resonator which requires complicated adjustment so as to obtain a high output, this invention is low in cost and easy to adjust, and can be used in light frequency conversion at the desired wavelength range. Furthermore, in the case of using a double confocal resonator, since it automatically functions as a resonator if an incident light beam is beside a predetermined position and direction, assembly is easy and does not require delicate adjustment. Moreover, this can attain a unified resonator formed with only a crystal, that is, a monolithic resonator formed with only a solid around a crystal.

Hence, in a wavelength conversion device using the nonlinear optical effect using a Fabry-Perot or circulation resonator, a light wavelength can be converted, condensing, mainly in one direction, the power of light of a new wavelength (i.e., an SHG light) obtained through setting beam diameters and radiuses of curvature of wavefronts of the optics of a resonator and incident light so that beam waist sizes of a light beam circulating in the resonator are different in a proceeding direction (forward path) and a returning direction (backward path).

In addition, although the SHG light generated with a light beam passing on a backward path in the above embodiment has a low ratio, it is preferable to locate a mirror at an incident light section of a resonator to remove the returned SHG light, considering the degradation of members in the incident light section.

A third embodiment will be discussed next. In the above embodiment, although a case is shown in which the present invention is applied to a reciprocation of resonator, a so-called ring resonator where a light beam circulates is better because a light beam in only one direction generates the SHG light using a conventional resonator in spite of a slightly complicated structure, and the resonator is used widely. Then, in this third embodiment, the present invention is applied to a resonator, including a so-called ring resonator.

An example of a wavelength conversion device using such ring resonator is a wavelength conversion device using a monolithic ring resonator utilizing the total reflection in a crystal proposed by W. J. Kozlovsky et al., Appl. Phys. Lett. 56 (1990), pp. 2291–2292. This wavelength conversion device can convert 105 mW of infrared light to 41 mW of blue light. Here, the reason why the total reflection in a crystal is used is to avoid the influence of reflection loss when light passes through an end face. Thus, since light in a resonator proceeds only in a crystal, reflection loss at an end face such as a boundary of a crystal and air does not occur through the total reflection.

However, on the one hand, as a light mode in a resonator, since a resonator is usually a stabile resonator, it is necessary to make a light beam having a predetermined beam diameter and curvature of wavefronts enter a resonator to increase efficiency.

On the other hand, as discussed in the above embodiment, a reciprocation confocal resonator and a double confocal resonator are not affected by a beam diameter of an incident light beam (Gaussian beam) and curvature of wavefronts, and they can use light power efficiently.

Figure 10:
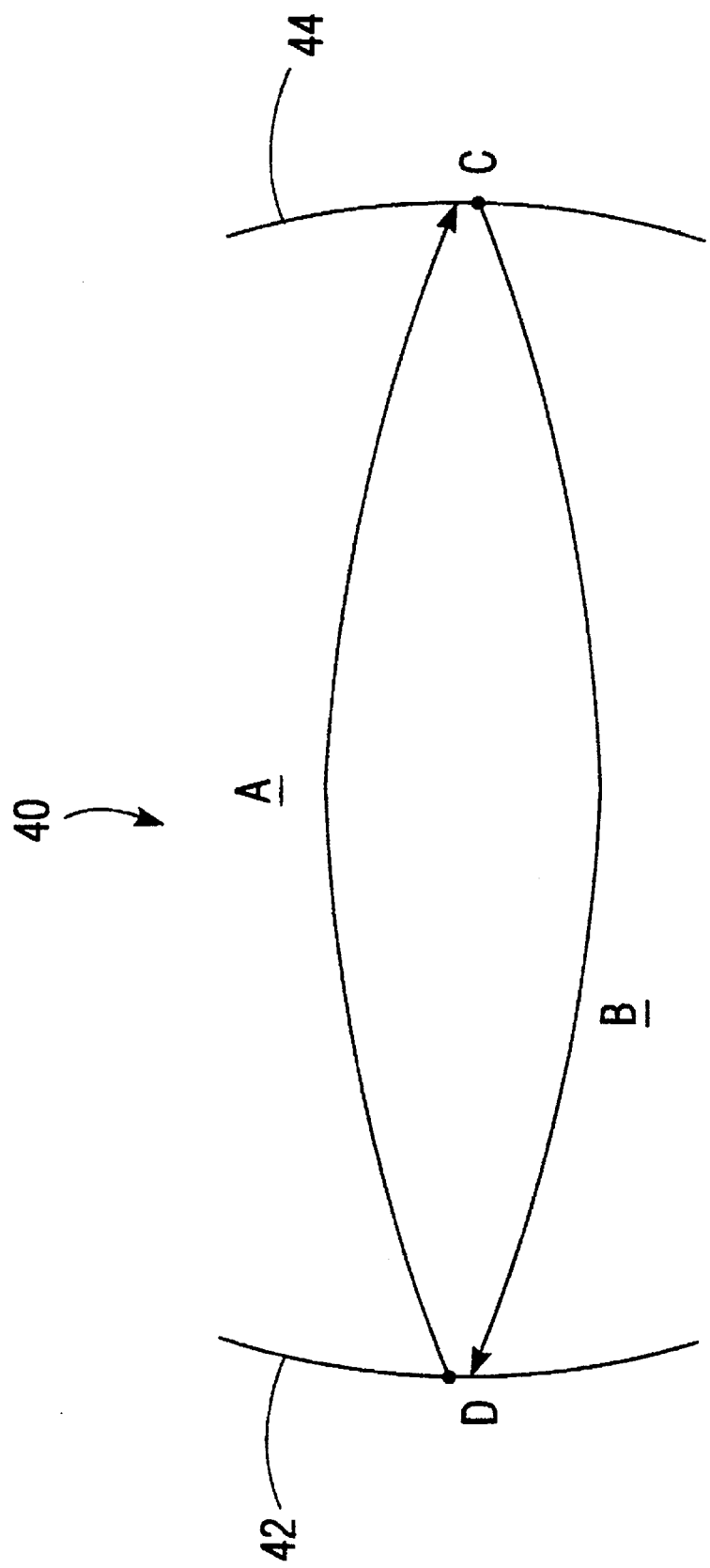
FIG. 10 is an explanatory diagram used to describe a ring resonator according to a third embodiment.

Then, if the concept of a confocal resonator such as the above embodiment is applied to a ring resonator, the power of an option Gaussian beam can be input to the resonator efficiently. In this case, a ring resonator can be designed so that a ray matrix for a light beam circulating in the resonator becomes a unit matrix or −1×unit matrix. In addition, for simplifying the following discussion, a 2×2 unit matrix I will be described:

First, in a resonator using two mirrors having the same radius of curvature, if condition J is assumed in which the optical distances as gaps are equal and they are equal to the radius of curvature of the mirrors, a ray matrix obtained as a unit matrix ±I will be described, referring to FIG. 10.

In a resonator 40 comprising a mirror 42 of radius of curvature R, and a mirror 44 of radius of curvature Q, if a light beam proceeds in space A on a forward path whose length is c, and the light beam proceeds in space B on a backward path whose length is d, in a ring, ray matrix S1 in space A on a forward path whose length is c can be expressed in Eq. 19, as follows, and ray matrix S2 in space B on a backward path whose length is d can be expressed as Eq. 20, as follows:

$$S1 = \begin{bmatrix} 1 & c \\ 0 & 1 \end{bmatrix} \quad (19)$$

$$S2 = \begin{bmatrix} 1 & d \\ 0 & 1 \end{bmatrix} \quad (20)$$

In addition, a ray matrix in the mirror 44 of radius of curvature R can be expressed in Eq. 21, if focal length f of the mirror 44 is half of the radius of curvature (2/R=f). A ray matrix in the mirror 42 of radius of curvature Q can be expressed in Eq. 22, as follows, if focal length g of the mirror 42 is half of the radius of curvature (2/Q=g):

$$M1 = \begin{bmatrix} 1 & 0 \\ -2/R & 1 \end{bmatrix} = \begin{bmatrix} 1 & 0 \\ -f & 1 \end{bmatrix} \quad (21)$$

$$M2 = \begin{bmatrix} 1 & 0 \\ -2/Q & 1 \end{bmatrix} = \begin{bmatrix} 1 & 0 \\ -g & 1 \end{bmatrix} \quad (22)$$

Thus, a ray matrix $T(=T_{21})$ for a path circulating through space A, a mirror 44, space B, and a mirror 42 can be expressed in Eq. 23 as follows:

$$T = M2 \cdot S2 \cdot M1 \cdot S1 \cdot = \begin{bmatrix} 1-df & c+d-cdf \\ -f-g+dfg & 1-dg+c(-f-g+dfg) \end{bmatrix} \quad (23)$$

Here, the relationship as shown in Eq. 24 is necessary to ensure that an origin of a light beam proceeding along the above circulating path is different and the light beam returns to the original site, that is, to ensure that ray matrix $T(=T_{21})$ above coincides ($T_{21}=T_{12}=0$) with ray matrix $T(=T_{12})$ circulating through the mirror 44, space B, the mirror 42, and space A.

$$f = \frac{1}{c} + \frac{1}{d}, d = \frac{1}{f} + \frac{1}{g} \quad (24)$$

Since the focal length is half of the radius of curvature, Eq. 25 is derived from Eq. 24, as follows:

$$d = \frac{R}{2} + \frac{Q}{2}, c = \frac{R}{Q}\left(\frac{R}{2} + \frac{Q}{2}\right) \quad (25)$$

Hence, Eq. 26 is derived from Eq. 23 and Eq. 25, above, as follows:

$$T = \begin{bmatrix} -f/g & 0 \\ 0 & -g/f \end{bmatrix} = \begin{bmatrix} -Q/R & 0 \\ 0 & -R/Q \end{bmatrix} \quad (26)$$

However, as known from Eq. 26 above, R=Q and c=d are necessary to ensure that ray matrix T is equal to ±I, where the unit matrix is I. Hence, the ray matrix that is equal to ±I can be obtained under condition J, where the unit matrix is I.

In addition, not only a beam diameter and a curvature of wavefront but also a position and direction to enter a beam are important in order to make a Gaussian beam effectively enter a resonator, but, when the above ray matrix is equal to unit matrix I, a light beam circulates in the resonator even if the direction and position of a light beam is a little beside their set values. Thus, even if a beam diameter, curvature of wavefront, and position and direction of an incident light beam are beside their set values, a light beam efficiently enters a resonator with light power.

An actual application to a resonator fulfilling condition J will be discussed hereinafter.

Figure 11:
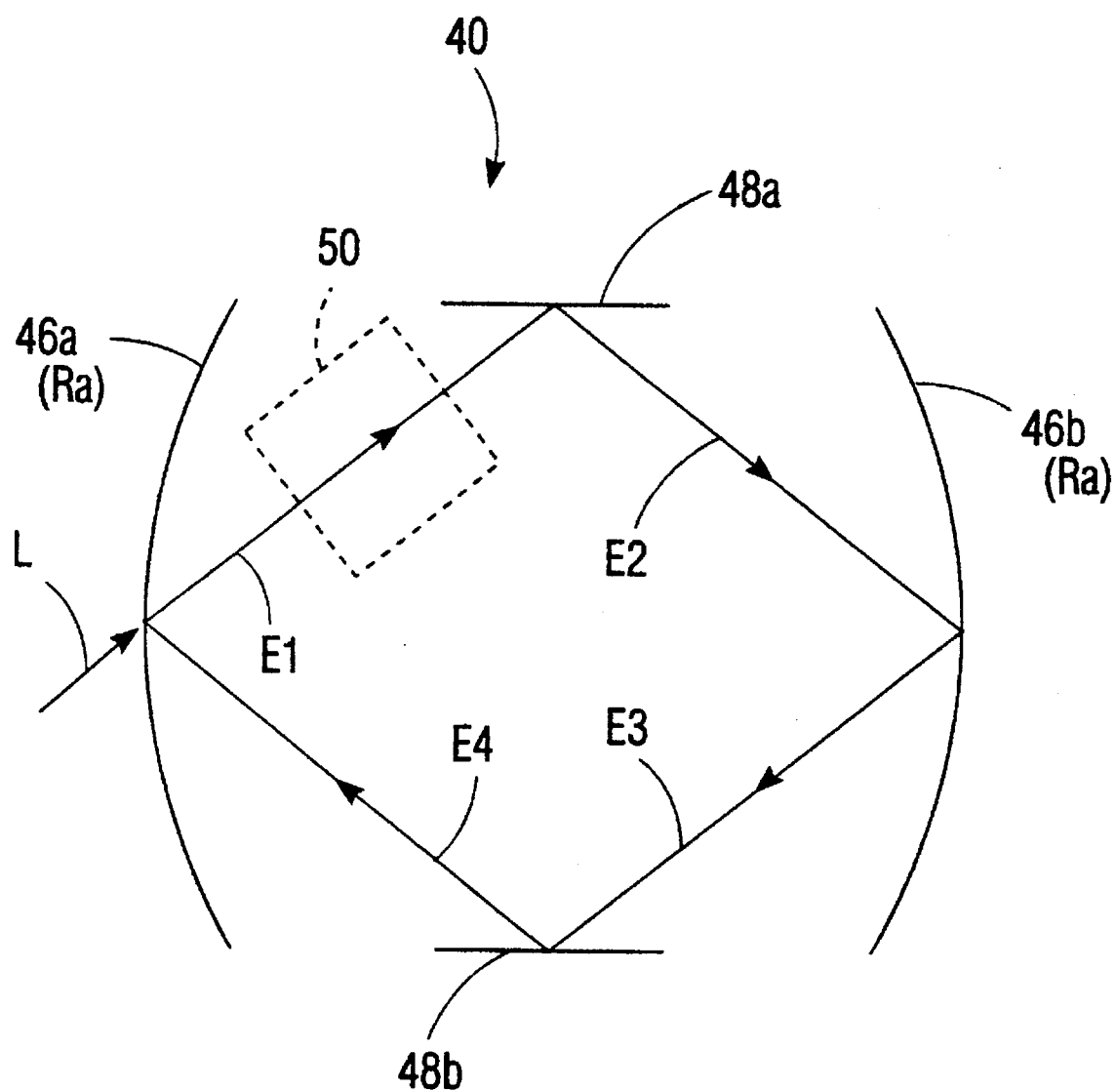
FIG. 11 is a schematic diagram showing a resonator comprising concave mirrors and flat mirrors as a first application example of a third embodiment.

As shown in FIG. 11, in a first application example, a resonator 40 comprises two concave mirrors 46a and 46b of the same radius of curvature Ra, fiat mirrors 48a and 48b as guide means between 46a and 46b. It is assumed that all light beams in a resonator 40 are on a plane (in this document, in FIG. 11). In the example in FIG. 11, when an optical path length adding optical path $E_1$ and optical path $E_2$ is equal to an optical path length adding optical path $E_3$ and optical path $E_4$, and when the optical path length is equal to twice the effective focal length between concave mirrors 46a and 46b, the resonator becomes a confocal ring resonator. Then, if a crystal 20 is disposed on any of optical paths $E_1$, $E_2$, $E_3$, and $E_4$ in the resonator (e.g., at the site shown by a dotted line 50 on optical path $E_1$) and phase matching is adjusted, and if a beam-condensing degree of incident light beam L is adjusted with a collimator lens system 18 so that a beam diameter becomes small in the crystal 20, a light beam in only one direction (direction along optical path $E_1$) enters the crystal 20 as an excitation light and an SHG light is efficiently generated.

Figure 12A:
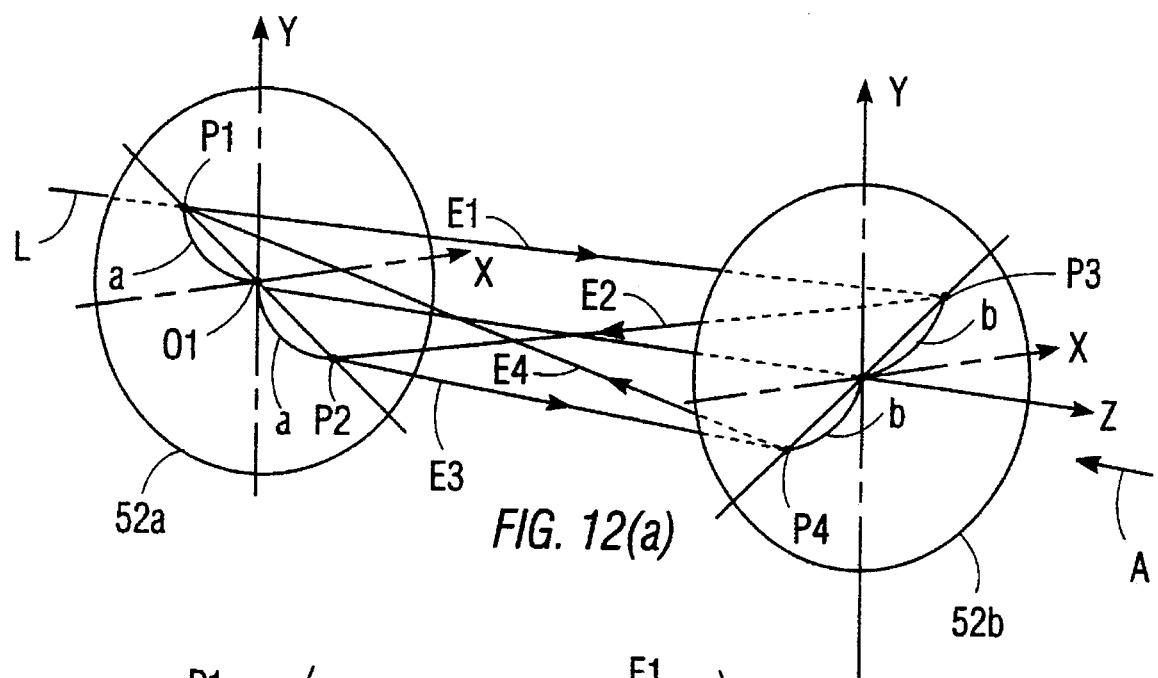
FIG. 12 is a schematic diagram showing a resonator using concave mirrors as a second application example of a third embodiment where (a) is a perspective view, (b) is a front view, and (c) is a side view.
Figure 12B:
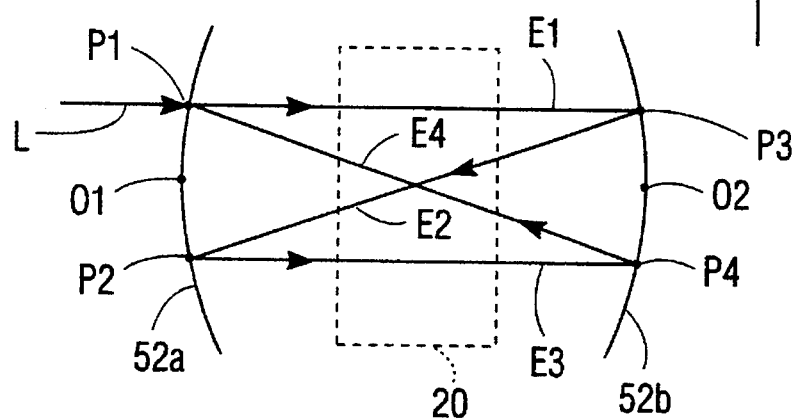
Figure 12C:
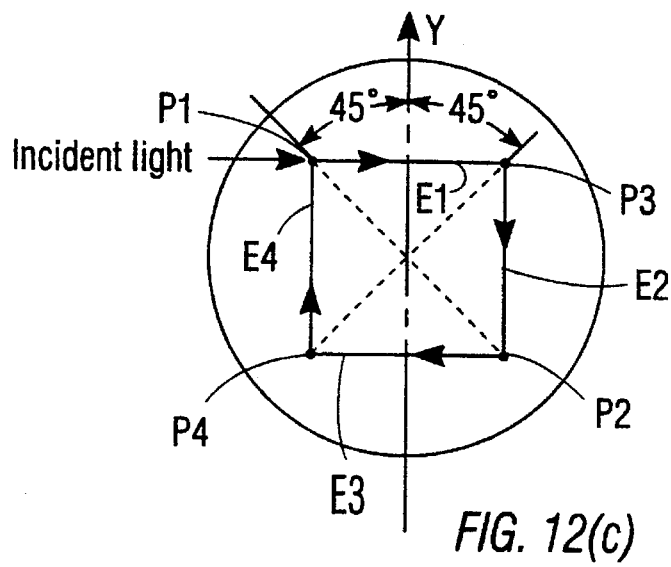

As shown in FIG. 12, in a second application example, a resonator 56 comprises two concave mirrors 52a and 52b of the same radius of curvature Rb which are located face-to-face, and centers $O_1$ and $O_2$ of a curvature positioned at the center of the two concave mirrors. Then, in this resonator 56, wherein a position at distance a from the center of curvature $O_1$ of the concave mirror 52a is referred to as incident point $P_1$, and light beam L enters from incident point $P_1$ to reflection point $P_3$ at a position at distance b from the center of curvature $O_2$ of the concave mirror 52b (refer to FIG. 12(a)), incident point $P_1$ of the concave mirror 52a crosses Y axis (clockwise in the base in a direction in which a light beam proceeds) at 45 degrees, and reflection point $P_3$ of the concave mirror 52b crosses the Y axis (counterclockwise in the base of the direction in which a light beam proceeds) at 45 degrees. Hence, looking from a radiation section of the concave mirror 52b in the direction of the concave mirror 52b (the direction of arrow A in FIG. 12), a light beam seems to circulate from incident point $P_1$, to reflection point $P_3$, to reflection point $P_4$, and to reflection point $P_2$ in this order (refer to FIG. 12(c)). Thus, line $P_1P_2$ connecting the incident point (also a reflection point) $P_1$ and reflection point $P_2$ of an incident light beam at the concave mirror 52a, and line $P_3P_4$ connecting reflection point $P_3$ and reflection point $P_4$ of a light beam at the concave mirror 52b have a twisted relation an angle of at 90 degrees. This second application example becomes a double confocal resonator in which path lengths of 4 optical paths such as optical path $E_1$, optical path $E_2$, optical path $E_3$, and optical path $E_4$ are equal to each other, as discussed in the second application example. Hence, in this resonator configuration, if a direction of phase matching of the crystal 20 coincides with any of optical paths $E_1$, $E_2$, $E_3$, and $E_4$ and the crystal 20 is disposed in the resonator (e.g., at the site shown by a dotted line), an SHG light is generated in the direction along the path attaining phase matching.

In this resonator 56, since a ray matrix becomes equivalent to unit matrix I in both directions along the x axis and y axis, a light beam can be enclosed in the resonator 56 even if the position and direction of incident light beam L are beside the set values. Thus, an incident light beam can be effectively used without loss.

Figure 13A:
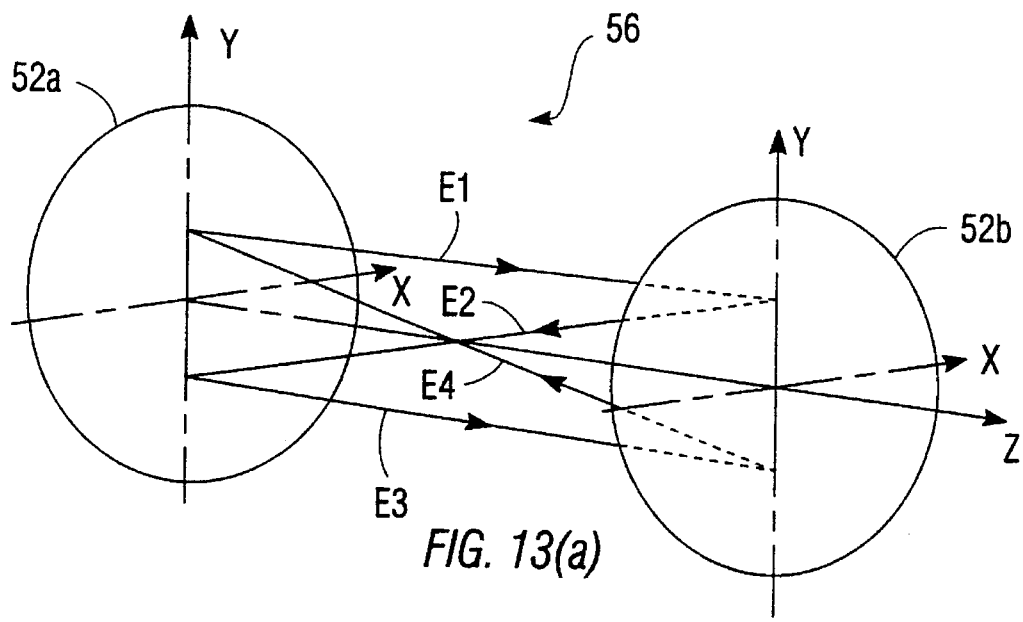
FIG. 13 is an image drawing showing a resonator composing an approximate confocal system where (a) is a perspective view, (b) is a front view, and (c) is a side view.

The above first and second application examples are strict confocal systems. Here, in a resonator 56 in FIG. 12, as shown in FIG. 13, an approximate confocal system can be composed through making a light beam L enter so that the beam proceeds on the YZ plane including the Y and Z axes. Hence, setting a ratio of height h from center $O_1$ of curvature of incident light beam L to distance e between two concave mirrors 52a and 52b at h:e=1:20, the difference in path lengths of optical paths $E_1$ and $E_2$ is 0.5%. Therefore, although power of a light beam is reduced to ⅓ after 20 times of circulation in a resonator 56, if the power loss of the light beam by circulating once in the resonator 56 is 5%, the change in the beam diameter is only about 10%. Hence, setting h:e sufficiently small, a resonator 56 having approximately the complete characteristics of a confocal system can be obtained.

Figure 13B:
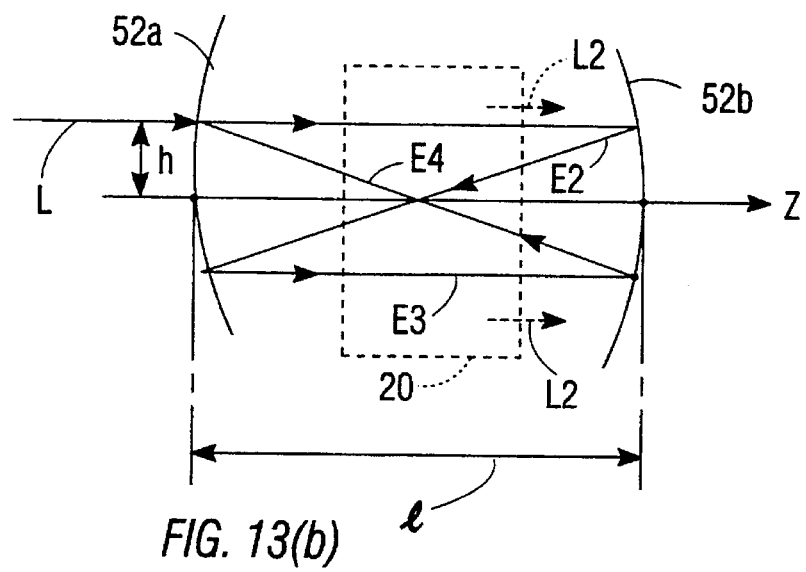
Figure 13C:
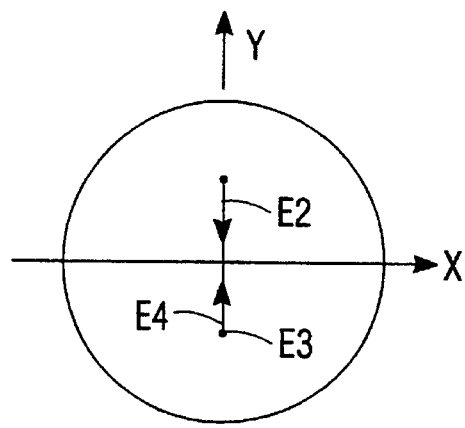

However, since, in a configuration in FIG. 13, optical paths $E_1$ and $E_3$ are in completely the same direction, the SHG light L2 is generated at two sites because of fulfilling the phase matching condition on optical paths $E_1$ and $E_3$, if the crystal 20 is disposed in the position shown by a dotted line in FIG. 13(b). Thus, the SHG light of a single light beam cannot be generated.

Therefore, as a third application example, in a resonator 56 structured as shown in FIG. 13, a fiat mirror functioning as a guide means is located on the XZ plane including the X axis and Z axis. Then, concave mirrors 52a and 52b are disposed so that their centers $O_1$ and $O_2$ of curvature are positioned in the center of the crossed lines of two concave mirrors and the flat mirror, and the direction of phase matching of the crystal 20 is made to coincide with the direction along optical path $E_1$. Hence, a light beam proceeding on optical path $E_2$ is polarized with the flat mirror, and is guided to optical path coinciding with optical path $E_4$. Then, the SHG light L2 can be generated by only optical path $E_1$.

Figure 14A:
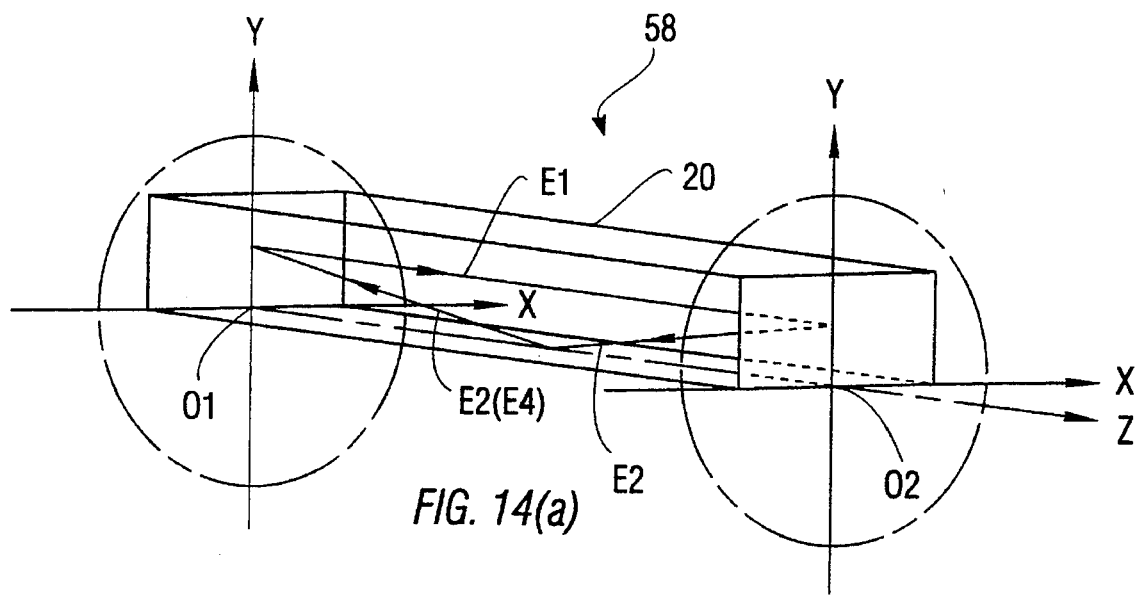
FIG. 14 is a schematic diagram of a resonator showing a third application example of a third embodiment where (a) is a perspective view, (b) is a front view, and (c) is a side view.
Figure 14B:
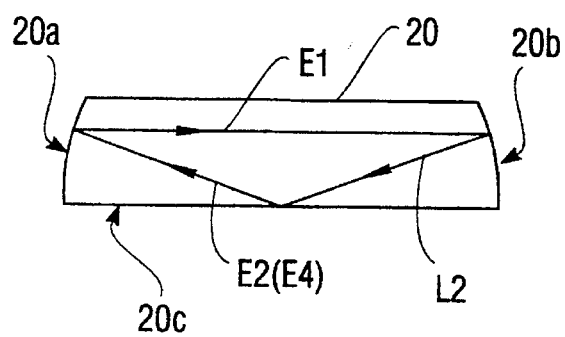
Figure 14C:
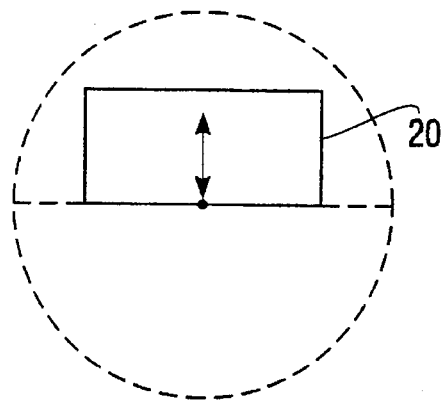

Loss in a resonator can be reduced through making this third application example a monolithic structure unifying a crystal 20 and concave mirrors. Hence, as shown in FIG. 14, regarding the upper section of the XZ plane in the resonator in FIG. 13 as a major structure, surface polishing of the lower surface 20c of a crystal 20 is performed to correspond to the flat mirror on the XZ plane, and spherical polishing of the end faces 20a and 20b of the incident light section and radiation section of a light beam in the crystal 20 to correspond to the concave mirrors 52a and 52b, then, a resonator 58 can be formed.

According to the structure of this resonator 58, a light beam can be enclosed within the resonator 58 even if incident light beam L strays off in the y direction.

In addition, if an ellipse shape is required to be the shape of a beam diameter of excitation light in the center of optical path $E_1$, the concave mirrors 52a and 52b can be changed to cylindrical mirrors so that their centers are on a line included in both of the concave mirrors and a lower plane. Thus, the crystal 20 can be formed so that the axis lines of two cylindrical mirrors become parallel. In this manner, according to the structure of the resonator 58 formed with a crystal having end faces of cylindrical mirrors, incident light beam L can stray off in the y direction, and this resonator is not sensitive to the x direction of straying.

Figure 15A:
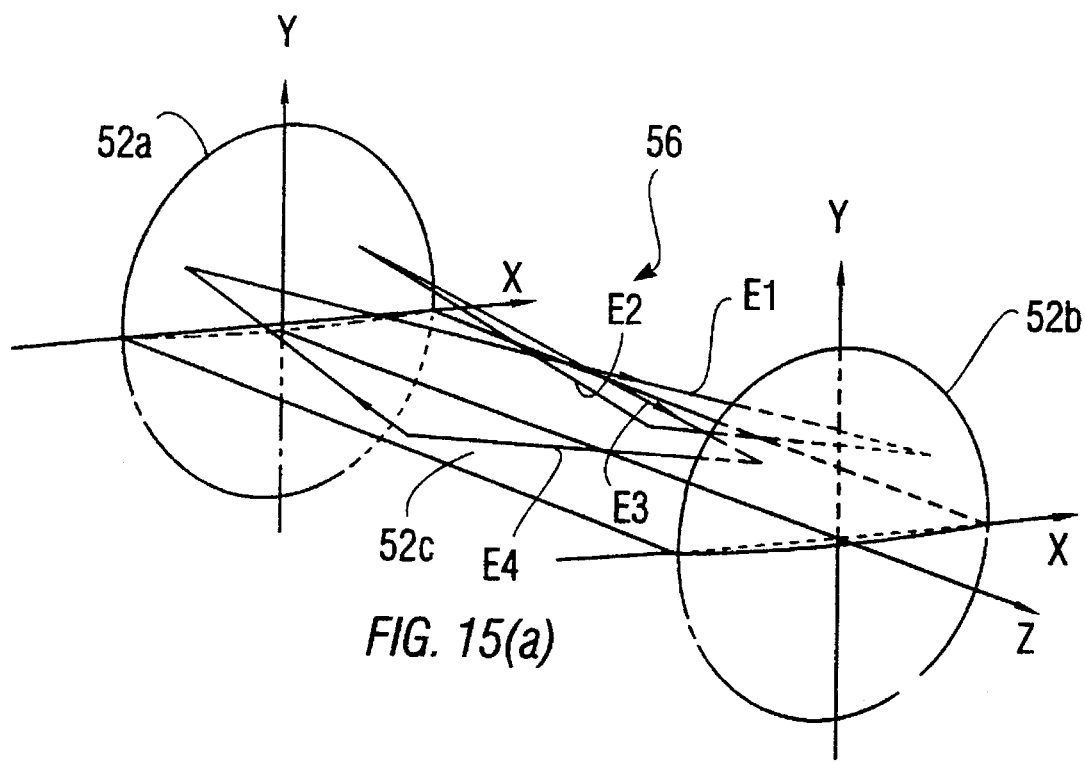
FIG. 15 is a schematic diagram of a resonator showing a fourth application example of a third embodiment where (a) is a perspective view, (b) is a front view, and (c) is a side view.
Figure 15B:
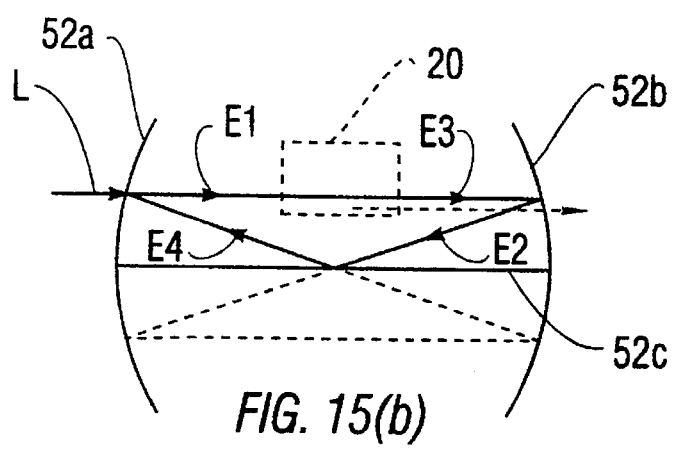
Figure 15C:
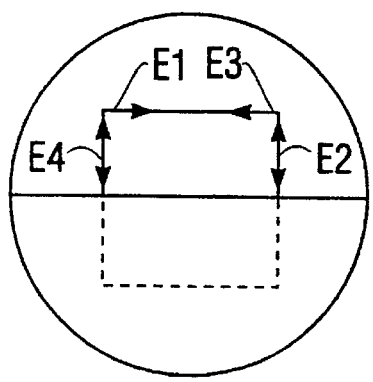

In a fourth application example, a case will be discussed regarding a double confocal resonator through locating a flat mirror functioning as a guide means. In an approximately similar structure as that of the resonator 56 in FIG. 13, as shown in FIG. 15, a flat mirror 52c is located on the XZ plane and, if the direction of an incident light beam is parallel to the XZ plane and not parallel to the Z axis, the incident light beam circulates twice in a space between concave mirrors 52a and 52b and the flat mirror 52c, and this functions as a double confocal resonator. In this manner, in a case of making a light beam enter, if a crystal 20 is disposed at the position shown by the dotted line in FIG. 15(b), the SHG light can be generated only from optical path $E_1$. Then, if phase matching coincides with optical path $E_1$, the SHG light cannot be generated from optical path $E_3$. Moreover, a monolithic structure can be formed through a whole resonator composed of a crystal. In addition, as understood from the drawings, the resonator in FIG. 15 is approximately equivalent to the case in which a flat mirror 52c is located in the resonator in FIG. 12, that is, on the ZX plane.

Figure 16A:
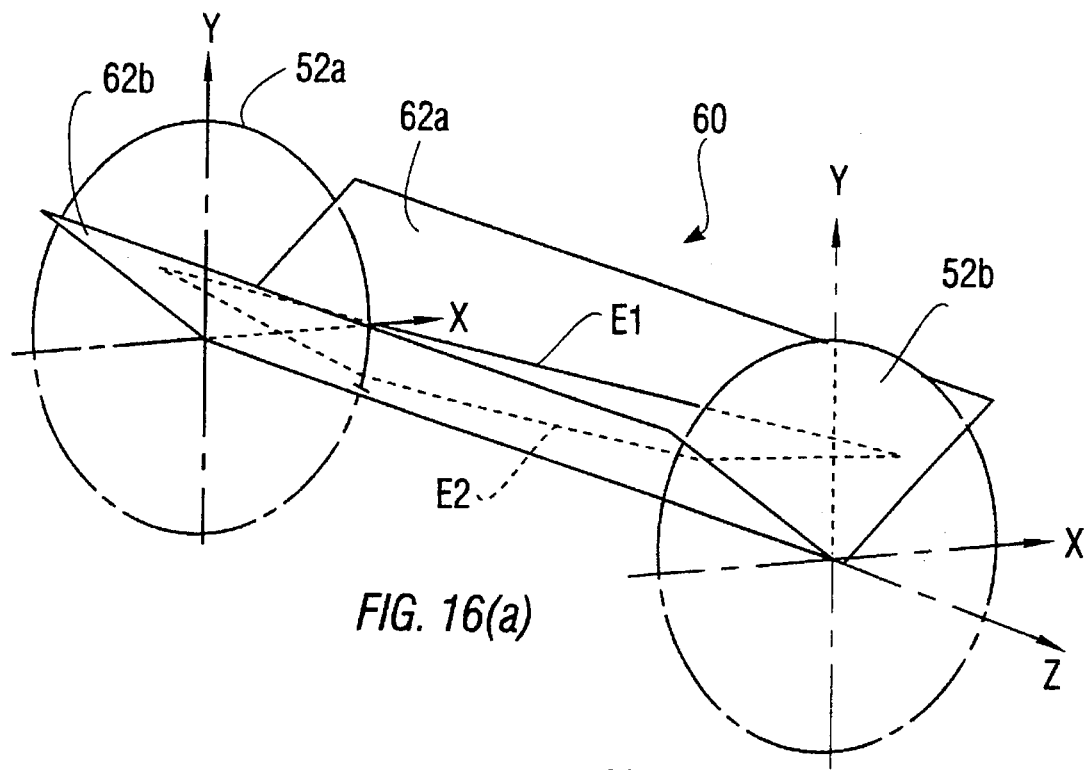
FIG. 16 is a schematic diagram of a resonator showing a fitch application example of a third embodiment where (a) is a perspective view, (b) is a front view, and (c) is a side view.
Figure 16B:
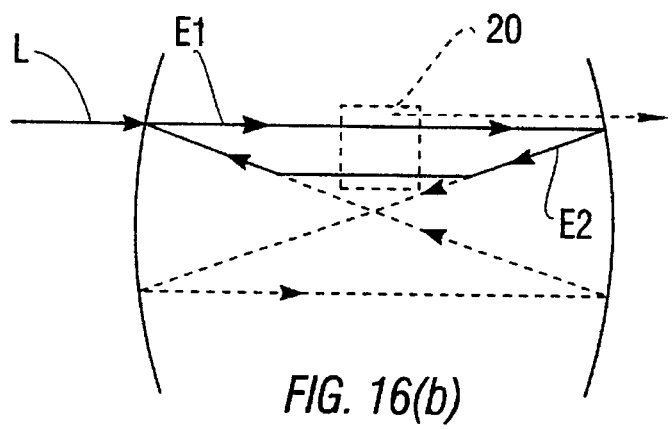
Figure 16C:
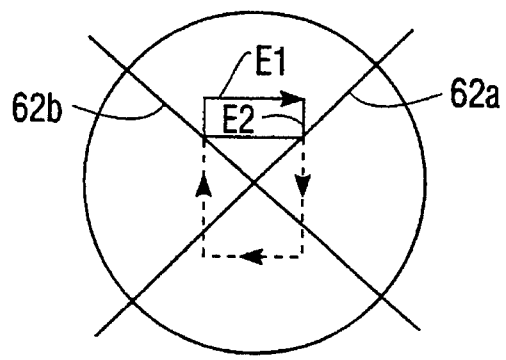

In a fifth application example, a ring resonator 60 comprises the resonator 56 (FIG. 12) discussed in the second application example, through disposing flat mirrors 62a and 62b including lines $O_1$ and $O_2$ connecting centers $O_1$ and $O_2$ of the curvature of the concave mirrors 52a and 52b, as shown in FIG. 16, functioning as a guide means for two planes intersecting orthogonally. If the crystal 20 is disposed at the position, e.g., center position, shown by the dotted line 64 in the resonator 60, and if the direction of phase matching is set in the direction of optical path $E_1$, SHG light L2 is generated in the direction of optical path $E_1$. The disposition in FIG. 16 can be attained in a monolithic structure. In addition, in this fifth application example, since the necessary volume of the crystal 20 is about ¼, the crystal can be effectively used by reducing the volume of the crystal 20.

Figure 17A:
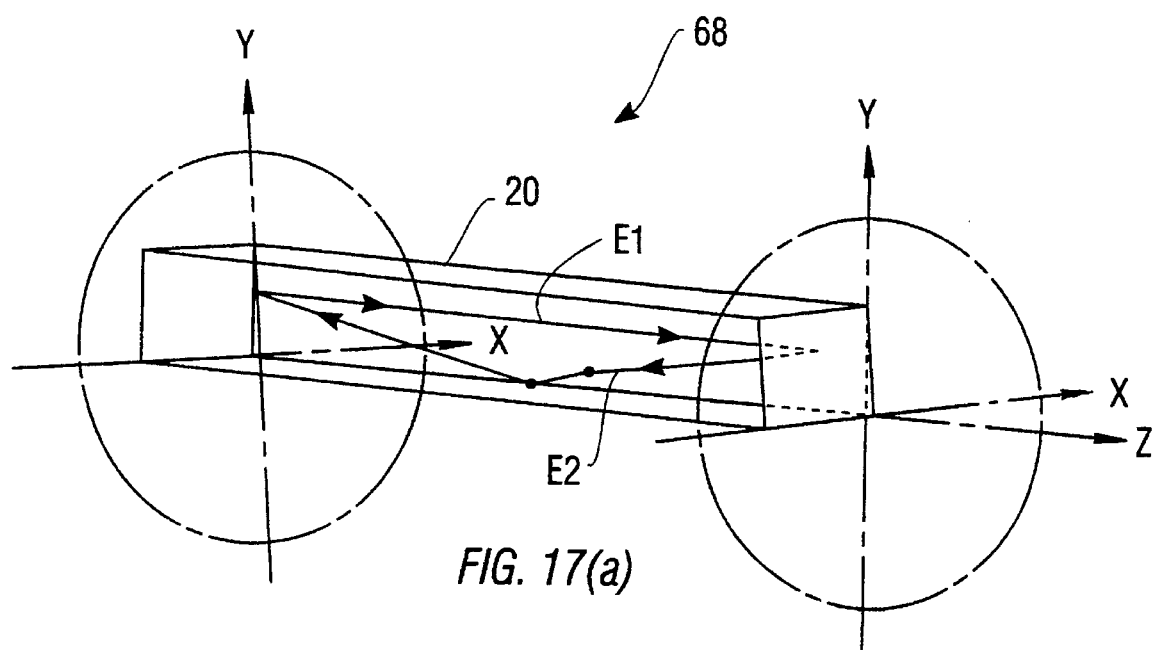
FIG. 17 is a schematic diagram of a resonator showing a modified example of a fitch application example of a third embodiment where (a) is a perspective view, (b) is a front view, and (c) is a side view.
Figure 17B:
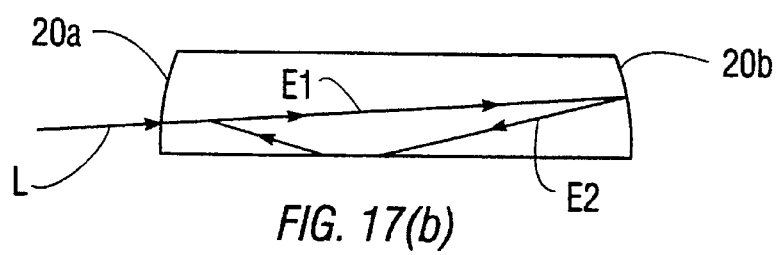
Figure 17C:
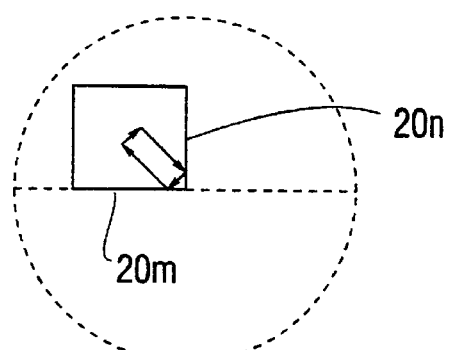

As shown in FIG. 17, in the fifth application example, a resonator 68 with a monolithic SHG element having a confocal resonator can be formed by polishing two side faces 20m and 20n of the crystal 20 so as to intersect orthogonally, and polishing the end face 20a of the incident section and end face 20b of the radiation section of a light beam at the crystal 20 so that the intersection line (ridge) of the two planes is located on the Z axis and they become cylindrical surfaces, taking the intersection line of one surface (side face 20 in FIG. 17) and the end face 20a and the end face 20b as an axis. The two side faces 20m and 20n of the crystal 20 function as a guide means. Coating that makes the reflectance of excitation light increase is performed for both curved surfaces (i.e., cylindrical surfaces) of the end faces. Then, the direction of phase matching is set in the direction along optical path $E_1$. In addition, as mentioned above, the direction of optical path $E_1$ to become a resonator can be set in some allowable range (so far as a light beam reflects at the predetermined plane).

Figure 18A:
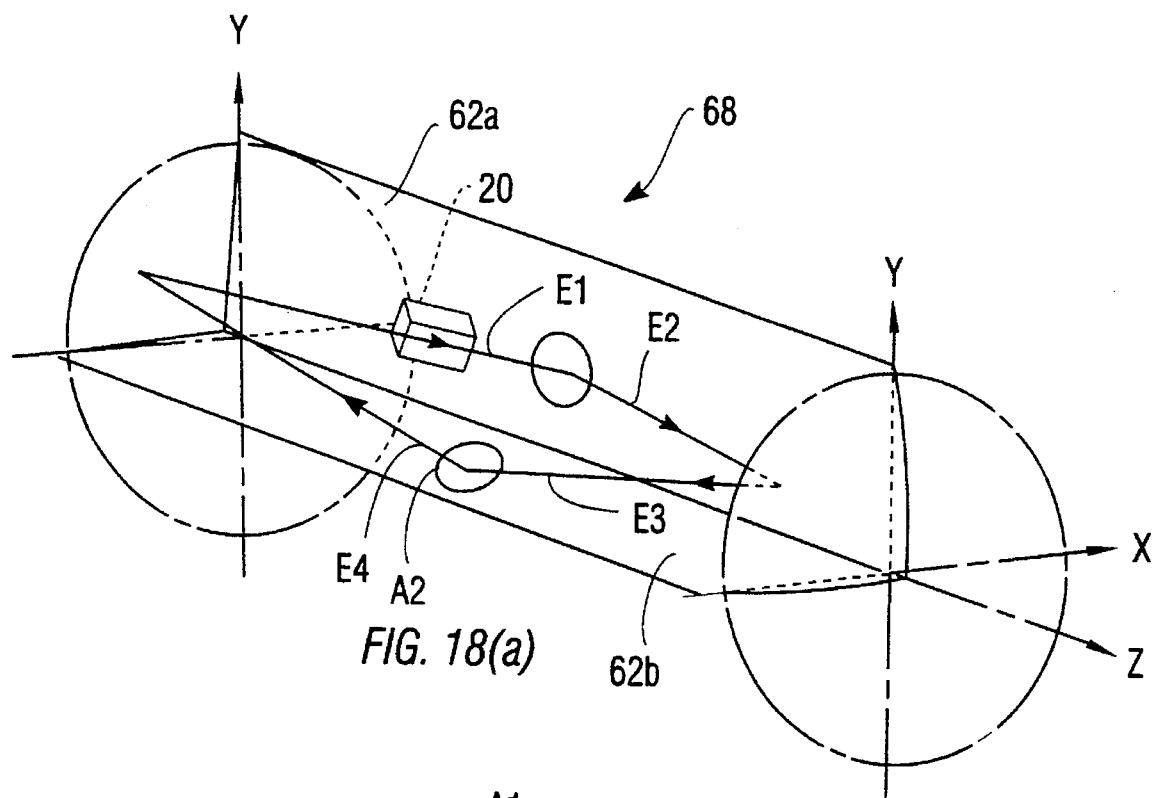
FIG. 18 is a schematic diagram of a resonator showing another modified example of a fifth application example of a third embodiment where (a) is a perspective view, (b) is a front view, and (c) is a side view.
Figure 18B:
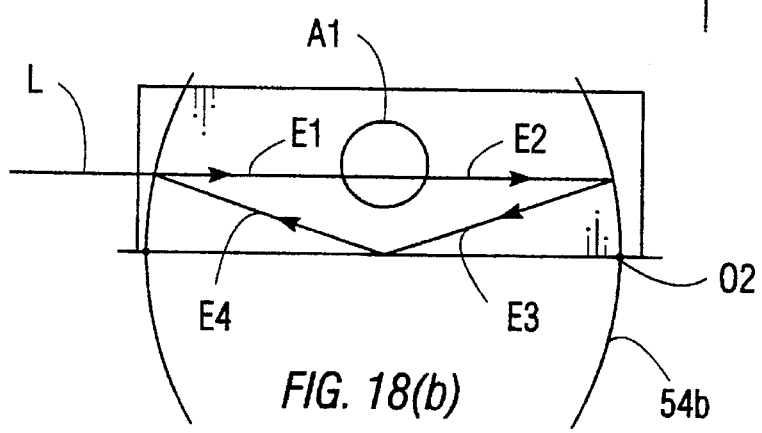
Figure 18C:
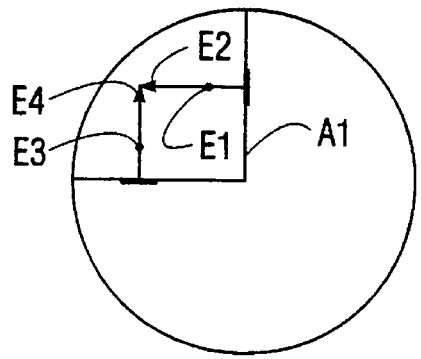

In an approximately similar structure to the crystal 20 shown in FIG. 17, as discussed in the fourth application example (refer to FIG. 15), if the direction of an incident light beam is parallel to the XZ plane but not parallel to the Z axis, optical path $E_1$ arriving at reflection region $A_1$ of the flat mirror 62a, and optical path $E_2$, where a light beam reflected at reflection region $A_1$, proceeds to the cylindrical mirror 54b on the same plane, as shown in FIG. 18. Furthermore, optical path $E_3$ where a light beam reflected by the cylindrical mirror 54b proceeds to reflection region $A_2$ of the flat mirror 62b, and optical path $E_4$ where a light beam reflected at reflection region $A_2$ proceeds to the cylindrical mirror 54a on the same plane. Reflection regions $A_1$ and $A_2$ function as a guide means. Then, the direction along the optical path $E_1$, becomes the direction of phase matching. This resonator 68, as shown in FIG. 19, can be formed in a monolithic structure ground as similar to the fitch application example shown in FIG. 17, the direction of phase matching being different from this resonator.

Since, in these resonators in the fourth and fitch application examples, a ray matrix becomes equal to unit matrix I in the x and y directions, a light beam can be enclosed within the resonator even if the incident position and direction of a light beam stray off.

Figure 19A:
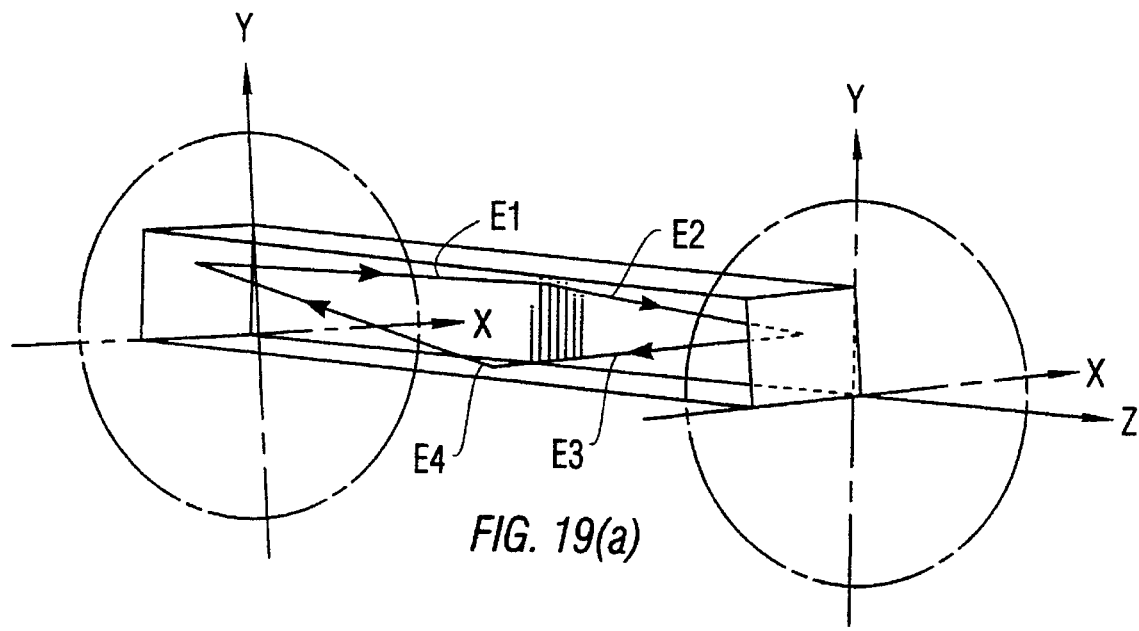
FIG. 19 is a schematic diagram of a resonator showing a further application example of a fifth application example of a third embodiment where (a) is a perspective view, (b) is a front view, and (c) is a side view.
Figure 19B:
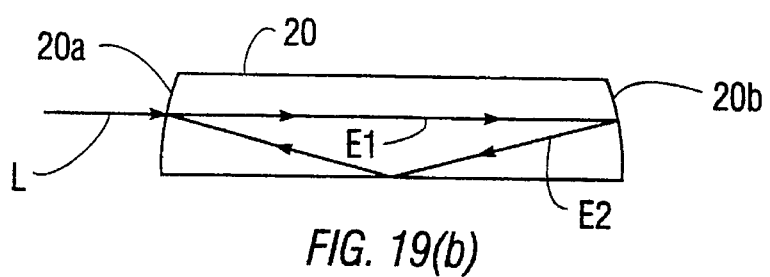
Figure 19C:
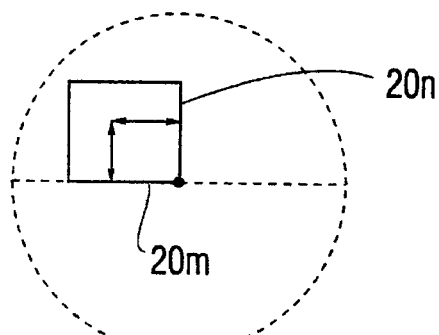

Moreover, in some resonators discussed in the application examples, although light beams circulating within the resonator do not pass on the same plane, a polarization change due to reflection can be disregarded if only polarized light parallel to the X axis or Y axis is used, as shown in FIG. 19.

In this manner, in this embodiment, the wavelength conversion device using the ring resonator can obtain the light beam of a converted wavelength in one direction with a light beam. Since the resonator is in the ring structure, an incident light beam for use as excitation light, that is, a light beam to the laser device does not return. Therefore, parts such as an isolator, etc., for preventing the return light become unnecessary. In addition, beam condensing conditions to perform adaptive wavelength conversion can be obtained through adjusting just the beam condensing conditions of an incident light beam from outside, without changing the parameters of the resonator through making the resonator the confocal or double confocal system. Moreover, this is easily applicable to beam condensing to make the shape of a light beam into an ellipse. Furthermore, since this can enclose a light beam within the resonator even if the position and direction of an incident light beam stray off, highly efficient conversion can be obtained. In addition, in this embodiment, since adjustment of the resonator is easy, assembly of the wavelength conversion device itself is easy, too. Furthermore, in a resonator according to this embodiment, since the monolithic structure unifies a crystal and reflection mirrors, loss of the resonator can be reduced and the SHG light can be obtained in high conversion efficiency.

Therefore, using a confocal ring resonator comprising two concave mirrors with the same radius of curvature, flat mirrors located between the two concave mirrors, etc., as an external resonator used to reinforce the nonlinear optical effect of a crystal, a beam diameter can be set freely, and stable and highly efficient wavelength conversion can be attained. In addition, in the case of angle phase matching of a crystal, although an ellipse shape of a light beam of a fundamental wavelength is required to make the beam shape of the SHG light adaptive, the confocal resonator can also enclose a light beam having such an ellipse shape of a light beam within the resonator automatically. Moreover, in a resonator that sets the number of reflection points on a reflection surface located between two or even-numbered mirrors having the same radius of curvature to be even among resonators that a light beam circulates within them, this can enclose a light beam within the resonator without adjusting optics even if the position and direction of an incident light beam of a fundamental wavelength stray off a little from the initial setting, and highly efficient conversion can be obtained.

In addition, a crystal 20 used as a nonlinear optical material in the above embodiments is composed of KDP, BBO, KTP, $LiNbO_3$, etc.

The above confocal resonators are applicable to various laser wavelength conversions. For example, blue near-ultraviolet light can be obtained through frequency multiplication of an infrared-red semiconductor laser and deep ultraviolet light can be obtained through frequency multiplication of a blue-green laser. Therefore, these resonators can be applied to the applications using these lights, such as the manufacturing of semiconductor devices, material processing, display devices, printers, three-dimensional hologram players, optochemicals, measurements, reactive monitors, etc. In particular, blue near-ultraviolet light can be obtained through frequency multiplication of an infrared-red semiconductor laser, and this output can be used in high-density optical recording. Moreover, deep ultraviolet light obtained through frequency multiplication of a blue-green laser is suitable to be used in the manufacturing of semiconductor devices, material processing, etc.

As above mentioned, according to the present invention, light transmitted a nonlinear optical material to generate light of at least one converted wavelength differing from the fundamental wavelength, such as an SHG light, with reflection means and reflection-transmission means, is radiated through the reflection means and reflection-transmission means again to the nonlinear optical material without meeting conditions, such as phase matching. Since the light of a covered wavelength does not transmit in the nonlinear optical material, a wavelength conversion device that has a simple structure, easy adjustment, and low cost can be obtained and, since the converted light is not generated in both directions, instability due to the interference effect does not occur.

What is claimed is:

1. A wavelength conversion device for conversion of light from a light radiation source that radiates light of a fundamental wavelength, comprising:

a nonlinear optical material having an index of refraction $n2$, a first flat outer face located so as to be irradiated by incident light from the source, and a second flat outer face parallel to said first flat outer face and spaced therefrom a distance y, the nonlinear optical material outputting both the incident light of a fundamental wavelength and light of at least one converted wavelength differing from the fundamental wavelength through said second outer flat face;

a light reflection-transmission mirror having a radius of curvature R greater than the curvature of the wavefront of the light from the source and spaced from said second outer face of said nonlinear optical material by a distance z for reflecting light of the fundamental wavelength from said nonlinear optical material so that the reflected beam diverges and the cross-sectional beam shape of said reflected fundamental wavelength light differs from that of the incident light, and for transmitting light of the converted wavelength; and a light reflection mirror located between said first outer face of said nonlinear optical material and the light radiation source and spaced from said first outer face by a distance x, the light reflection mirror having a radius of curvature R, for reflecting back the light reflected by said reflection-transmission mirror so that said reflected back light converges along an optical path generally coincident with the optical path of said incident light of the fundamental wavelength, the space between the mirrors and the nonlinear optical material being occupied by a medium having an index of refraction $n1$ and the radius of curvature R of the mirrors being generally equal to $x+y(n1/n2)+z$, whereby the converging beam reflected back by said light reflection mirror has a cross-sectional beam shape generally equal to that of the incident light of the fundamental wavelength from the source.

2. The wavelength conversion device of claim 1 wherein the medium in the space between the mirrors and the nonlinear optical material is the same material as the nonlinear optical material, whereby $n2=n1$ and the overall length of the wavelength conversion device is approximately equal to R.

* * * * *